US012267673B2

(12) United States Patent
Shibata et al.

(10) Patent No.: US 12,267,673 B2
(45) Date of Patent: Apr. 1, 2025

(54) NON-TRANSITORY COMPUTER-READABLE RECORDING MEDIUM STORING COMPUTER-READABLE INSTRUCTIONS FOR ESTABLISHING A WIRELESS CONNECTION BETWEEN A COMMUNICATION DEVICE AND AN EXTERNAL DEVICE

(71) Applicant: BROTHER KOGYO KABUSHIKI KAISHA, Nagoya (JP)

(72) Inventors: Takeshi Shibata, Nagoya (JP); Hirotaka Asakura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 356 days.

(21) Appl. No.: 17/730,303

(22) Filed: Apr. 27, 2022

(65) Prior Publication Data

US 2022/0353679 A1 Nov. 3, 2022

(30) Foreign Application Priority Data

Apr. 28, 2021 (JP) ................. 2021-076390

(51) Int. Cl.
*H04W 12/06* (2021.01)
*H04W 76/15* (2018.01)
*H04W 84/12* (2009.01)

(52) U.S. Cl.
CPC .......... *H04W 12/06* (2013.01); *H04W 76/15* (2018.02); *H04W 84/12* (2013.01)

(58) Field of Classification Search
CPC ..... H04W 12/06; H04W 76/15; H04W 84/12; H04W 12/55; H04L 69/18
See application file for complete search history.

(56) References Cited

U.S. PATENT DOCUMENTS 11,785,457 B2 * 10/2023 Takeuchi .............. H04L 63/105
  726/6
11,816,370 B2 * 11/2023 Minakawa ............ G06F 3/1284
(Continued)

FOREIGN PATENT DOCUMENTS

JP  2017-050780 A  3/2017
JP  2019-193120 A  10/2019
(Continued)

OTHER PUBLICATIONS

Device Provisioning Protocol Specification Version 1.1.13, Wi-Fi Alliance, 2019.
(Continued)

*Primary Examiner* — Venkat Perungavoor
*Assistant Examiner* — Peiliang Pan
(74) *Attorney, Agent, or Firm* — Scully, Scott, Murphy & Presser, PC

(57) ABSTRACT

A terminal device may be configured to receive support information from a communication device by using a first wireless connection which has been established between the terminal device and the communication device. The support information may indicate whether the communication device supports a predetermined scheme. The terminal device may be configured to, in a case where the support information indicates that the communication device supports the predetermined scheme, execute a first control process for executing wireless communication in conformity with the predetermined scheme between the terminal device and the communication device. The terminal device may be configured to, in a case where the support information indicates that the communication device does not support the predetermined scheme, execute a second control process for executing wireless communication in conformity with a (Continued)

different scheme different from the predetermined scheme between the terminal device and the communication device.

18 Claims, 12 Drawing Sheets

(56) References Cited

U.S. PATENT DOCUMENTS

| | | | | |
|---|---|---|---|---|
| 11,838,116 | B2* | 12/2023 | Goto | H04L 63/0869 |
| 11,856,089 | B2* | 12/2023 | Suzuki | H04W 12/062 |
| 2015/0092601 | A1* | 4/2015 | Ando | H04W 12/50 370/254 |
| 2017/0070951 | A1 | 3/2017 | Takeuchi | |
| 2018/0213578 | A1* | 7/2018 | Tachibana | H04W 12/06 |
| 2019/0334892 | A1 | 10/2019 | Goto | |
| 2020/0014656 | A1* | 1/2020 | Ding | H04L 61/4541 |
| 2020/0104081 | A1 | 4/2020 | Miyake | |
| 2020/0220718 | A1* | 7/2020 | Tsuji | H04N 1/4413 |
| 2021/0007164 | A1* | 1/2021 | Shibata | H04L 9/30 |
| 2021/0067953 | A1* | 3/2021 | Miyake | H04W 4/80 |
| 2021/0099305 | A1 | 4/2021 | Shibata et al. | |
| 2021/0282011 | A1 | 9/2021 | Tachibana | |
| 2023/0397003 | A1* | 12/2023 | Takeuchi | H04W 12/03 |

FOREIGN PATENT DOCUMENTS

| | | |
|---|---|---|
| JP | 2020088620 A | 6/2020 |
| JP | 2020113851 A | 7/2020 |
| JP | 2021-057760 A | 4/2021 |

OTHER PUBLICATIONS

Wi-Fi Peer-to-Peer(P2P) Technical Specification Version 1.1, Wi-Fi Alliance, 2010.
Extended European Search Report dated Aug. 29, 2022 from related EP 22 16 9963.
European Office Action dated May 24, 2024 issued in related EP 22 169 963.0.

* cited by examiner

FIG. 9

(Second Embodiment)

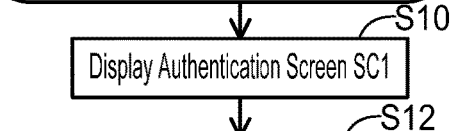
Process by App
(Trigger = Establishment of WFD Connection)

↓ S10
Display Authentication Screen SC1

↓ S12
Accept User Authentication Information

↓ S14
Send User Authentication Information

↓ S16
User Authentication Successful? —NO→

↓ YES  S122
Wi-Fi Connection Established? —NO→

↓ YES  S20
Terminal Supports DPP? —NO→

↓ YES  S30
Send Inquiry and Receive Response

↓ S32
Printer Supports DPP? —NO→

↓ YES  S34
Display Confirmation Screen SC2

↓ S36
OK Selected? —NO→

↓ YES  S40
Send BS Information Sending Request

↓ S42
Receive BS Information

↓ S44
Send Shift Request

↓ S150
Supply DPP Start Instruction to OS

↓
End

SC1:
Please input user name and password.
User Name: [ ]
PW: [ ]
[OK]  [Cancel]

SC2:
Start Wi-Fi setting of following printer.
· Printer ID : AAA
· Function Information : Color Printing, Two-sided Printing, ···
· Status : Normal
[OK]  [Cancel]

(Right branch:)
S60: Send Inquiry and Receive Response
↓ S62
Display Confirmation Screen SC2
↓ S64
OK Selected? —NO→ End
↓ YES  S166
Obtain SSID
↓ S70
Display Input Screen SC3
↓ S72
Accept PW Input? —NO→
↓ YES  S74
Send SSID and PW
↓
End

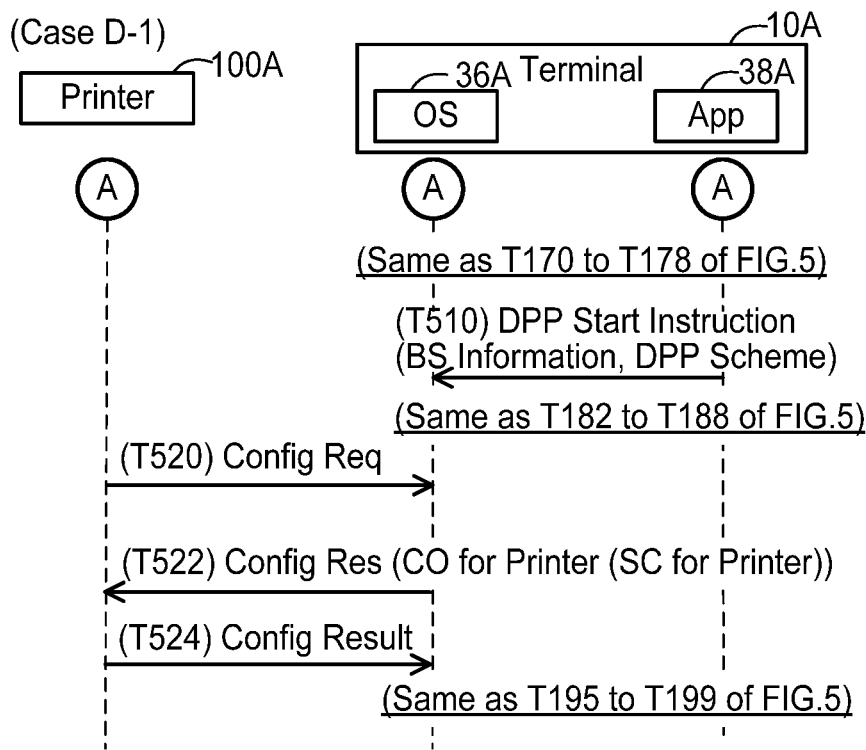
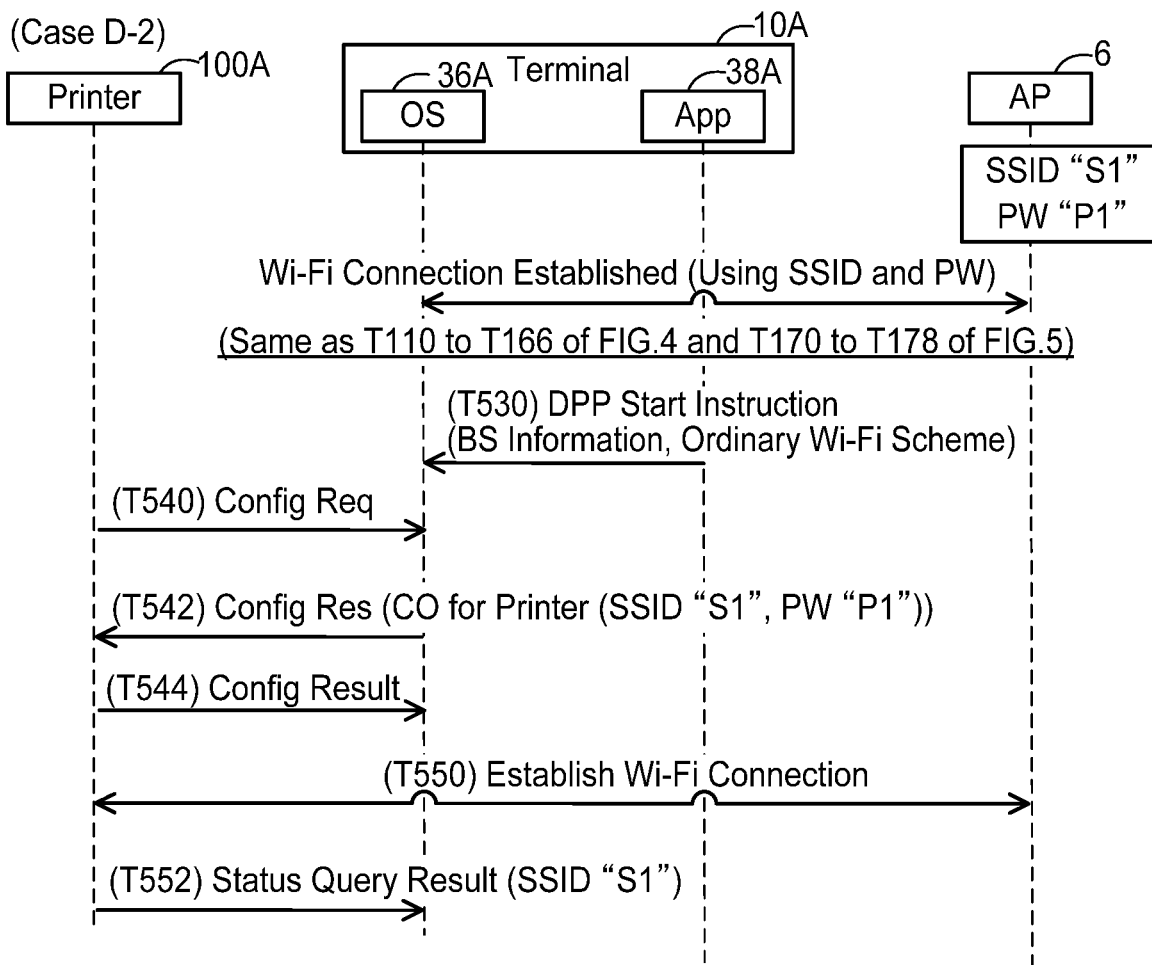
FIG. 10

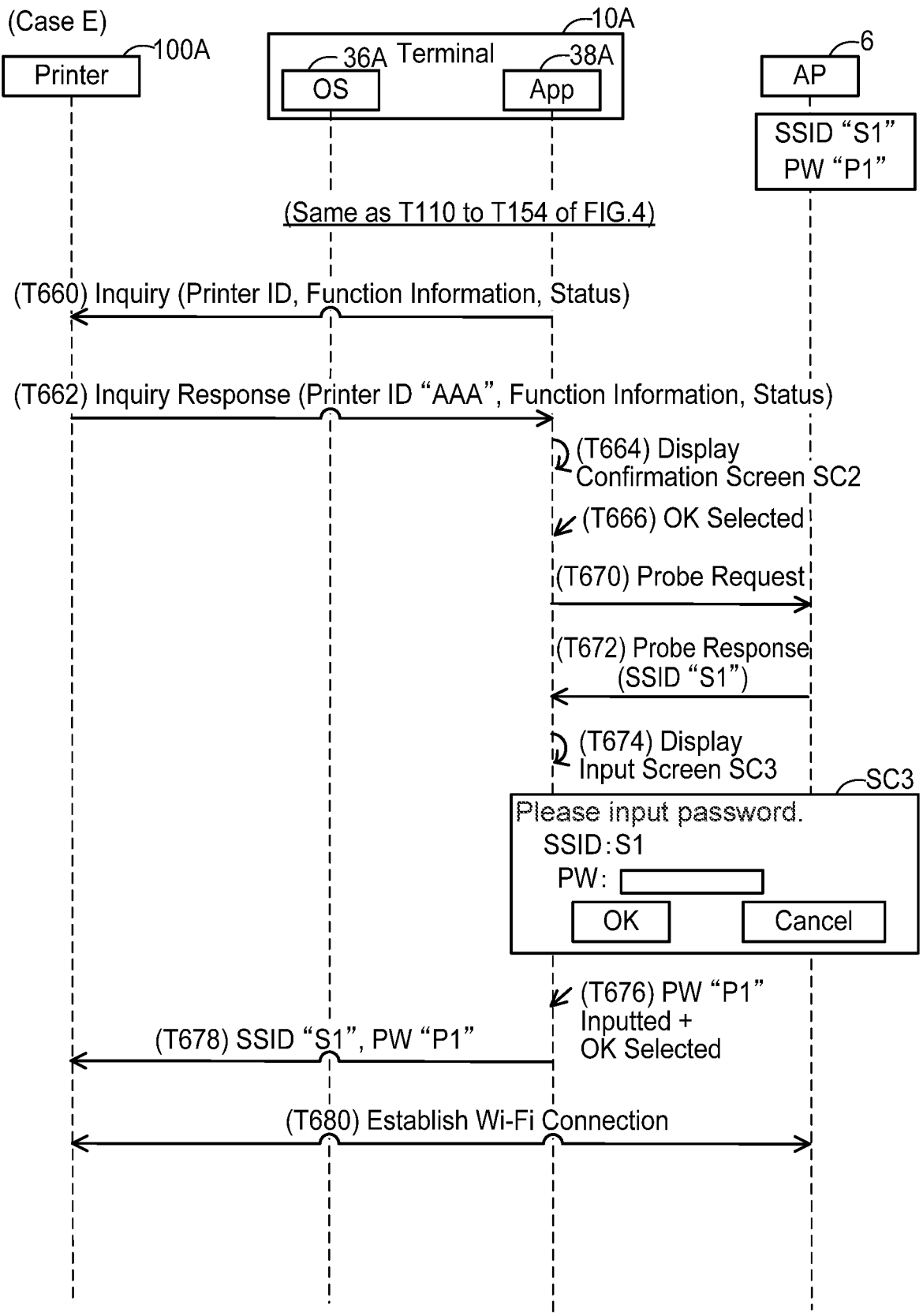

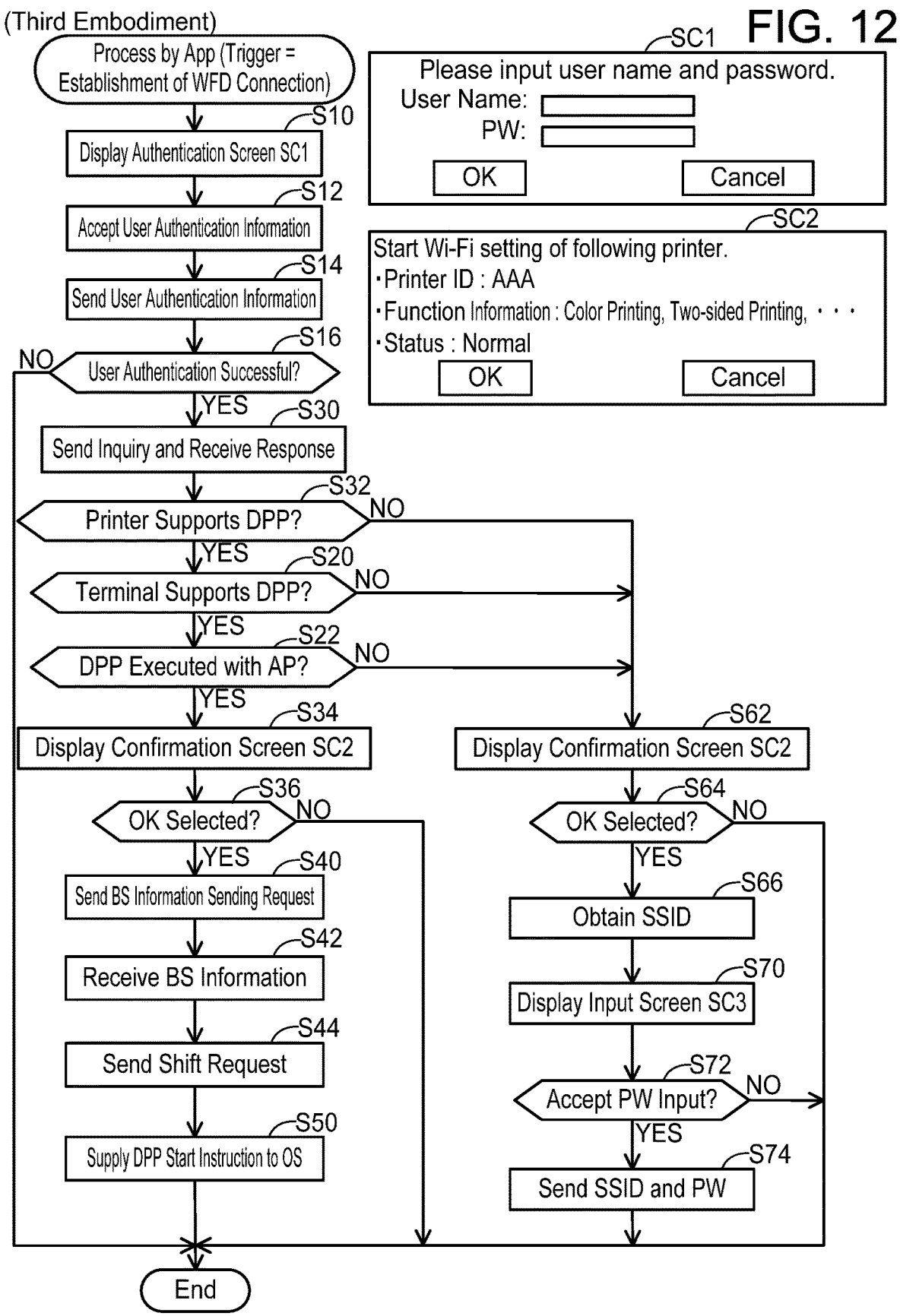

NON-TRANSITORY COMPUTER-READABLE RECORDING MEDIUM STORING COMPUTER-READABLE INSTRUCTIONS FOR ESTABLISHING A WIRELESS CONNECTION BETWEEN A COMMUNICATION DEVICE AND AN EXTERNAL DEVICE

CROSS-REFERENCE TO RELATED APPLICATION

This application claims priority to Japanese Patent Application No. 2021-076390, filed on Apr. 28, 2021, the entire contents of which are incorporated herein by reference.

BACKGROUND

A technique to establish a Wi-Fi connection between a printer and an access point (hereafter referred to as "AP") by using a terminal is known. In particular, a technique to establish a Wi-Fi connection between a printer and an AP in conformity with a Device Provisioning Protocol (DPP) scheme and a technique to establish a Wi-Fi connection between a printer and an AP in conformity with a non-DPP scheme different from the DPP scheme are known.

SUMMARY

The present disclosure provides a technique that can establish a wireless connection in conformity with a suitable scheme between a communication device and an external device by using a terminal device.

The present disclosure discloses a non-transitory computer-readable recording medium storing computer-readable instructions for a terminal device. The computer-readable instructions, when executed by a processor of the terminal device, may cause the terminal device to receive support information from a communication device by using a first wireless connection which has been established between the terminal device and the communication device. The support information may indicate whether the communication device supports a predetermined scheme of a Wi-Fi standard. The computer-readable instructions, when executed by a processor of the terminal device, may cause the terminal device to, in a case where the support information indicates that the communication device supports the predetermined scheme, execute a first control process for executing wireless communication in conformity with the predetermined scheme between the terminal device and the communication device. The wireless communication in conformity with the predetermined scheme may include sending an authentication request in which a public key of the communication device is used to the communication device. The wireless communication in conformity with the predetermined scheme may include, in a case where the authentication request is sent to the communication device, receiving an authentication response from the communication device. The wireless communication in conformity with the predetermined scheme may include, after the authentication response has been received from the communication device, sending first connection information to the communication device. The first connection information may be information used by the communication device for establishing a second wireless connection in conformity with the Wi-Fi standard between the communication device and an external device different from the terminal device. The computer-readable instructions, when executed by a processor of the terminal device, may cause the terminal device to, in a case where the support information indicates that the communication device does not support the predetermined scheme, execute a second control process for executing wireless communication in conformity with a different scheme of the Wi-Fi standard different from the predetermined scheme between the terminal device and the communication device. The wireless communication in conformity with the different scheme may include sending second connection information to the communication device by using the first wireless connection without sending the authentication request to the communication device. The second connection information may be information used by the communication device for establishing a third wireless connection in conformity with the Wi-Fi standard between the communication device and the external device.

According to the above configuration, in the case where the communication device supports the predetermined scheme, the terminal device can establish the second wireless connection between the communication device and the external device by executing the first control process for executing the wireless communication in conformity with the predetermined scheme. Further, in the case where the communication device does not support the predetermined scheme, the terminal device can establish the third wireless communication between the communication device and the external device by executing the second control process for executing the wireless communication in conformity with the different scheme different from the predetermined scheme. Consequently, the terminal device can establish the wireless connection in conformity with the suitable scheme between the connection device and the external device.

The present disclosure further discloses a communication device. The communication device may comprise: a controller, wherein the controller is configured to: receive an authentication request in which a public key of the communication device is used from a terminal device, the authentication request being in conformity with a predetermined scheme of a Wi-Fi standard; in a case where the authentication request is received from the terminal device, send an authentication response in conformity with the predetermined scheme to the terminal device; after the authentication response has been sent to the terminal device, receive first connection information in conformity with the predetermined scheme from the terminal device; in a case where the first connection information is received from the terminal device, establish a second wireless connection with an external device different from the terminal device by using the first connection information; receive second connection information from the terminal device by using a first wireless connection which has been established between the terminal device and the communication device without receiving the authentication request from the terminal device, the second connection information being information in conformity with a different scheme of the Wi-Fi standard different from the predetermined scheme; and in a case where the second connection information is received from the terminal device, establish a third wireless connection in conformity with the Wi-Fi standard with the external device by using the second connection information.

According to the above configuration, the communication device can establish the second wireless connection with the external device in response to receiving the first connection information from the terminal device. Further, the communication device can establish the third wireless connection with the external device in response to receiving the second connection information from the terminal device. Consequently, the communication device can establish the wireless connection in conformity with the suitable scheme between the communication device and the external device by using the terminal device.

Computer-readable instructions for the above communication device, a computer-readable recording medium storing the computer-readable instructions, and a method executed by the communication device are also novel and useful. Further, the computer-readable recording medium storing the computer-readable instructions for the above terminal device, a terminal device realized by the computer-readable instructions, and a method executed by the terminal device are also novel and useful. Further, a system comprising the above communication device and the terminal device realized by the above computer-readable instructions is also novel and useful.

BRIEF DESCRIPTION I/F THE DRAWINGS

FIG. 9 illustrates a flowchart of a process executed by an application of a second embodiment;

FIG. 10 illustrates sequence diagrams of Case D-1 and Case D-2;

FIG. 11 illustrates a sequence diagram of Case E, and

FIG. 12 illustrates a flowchart of a process executed by an application of a third embodiment.

DETAILED DESCRIPTION

Figure 1:
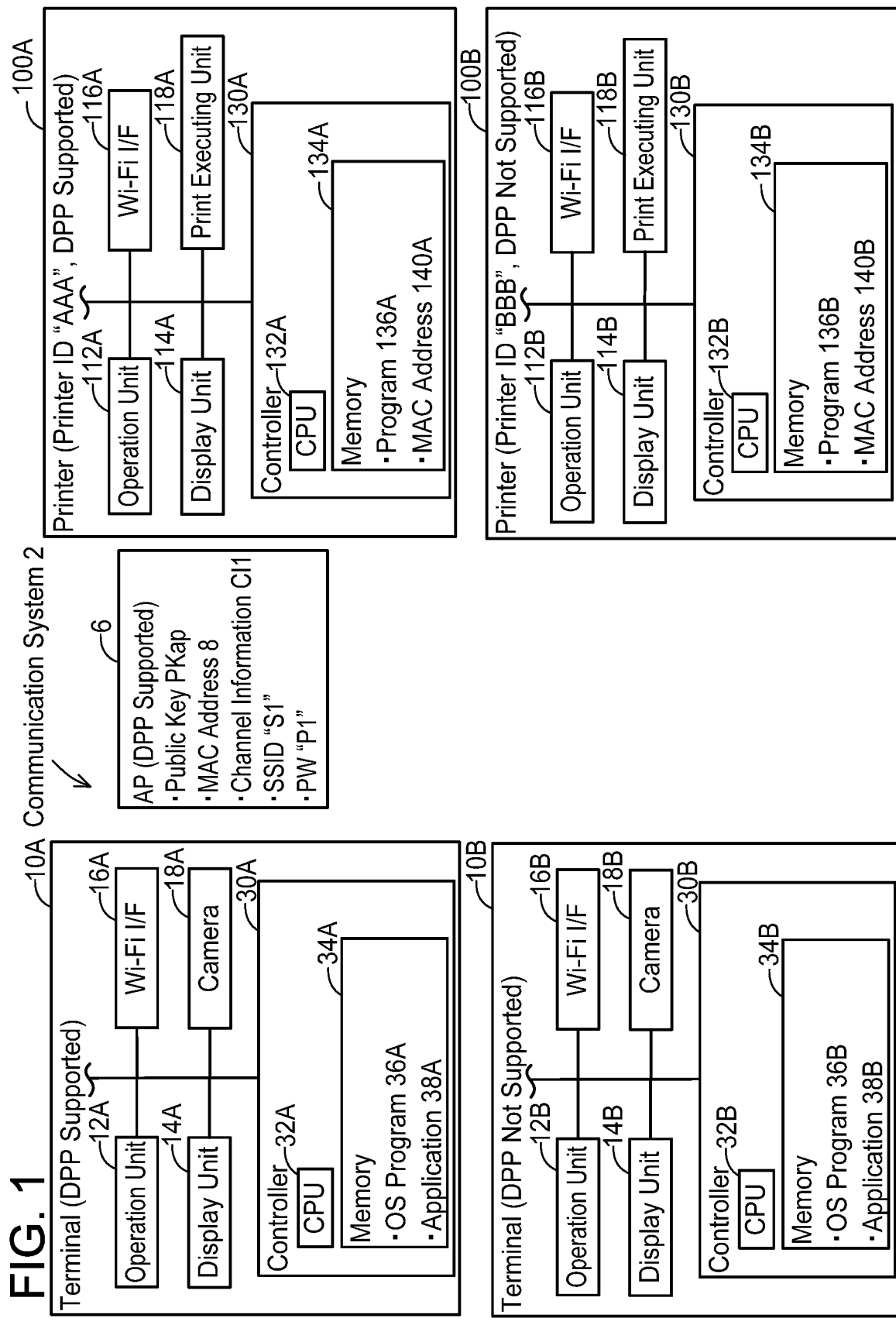
FIG. 1 illustrates a configuration of a communication system.

First Embodiment (Configuration of Communication System 2; FIG. 1)

As illustrated in FIG. 1, a communication system 2 comprises a plurality of terminals 10A, 10B, a plurality of printers 100A, 100B, and an Access Point (AP) 6. The technique of the present embodiment is a technique to establish a wireless connection in conformity with the Wi-Fi standard (hereafter referred to as "Wi-Fi connection") between a printer (e.g., 100A) and the AP 6 by using a terminal (e.g., 10A).

(Configuration of Terminal 10A)

The terminal 10A is a portable terminal device such as a cell phone (e.g., a smartphone), a PDA, a tablet PC, or the like. In a variant, the terminal 10A may be a stationary PC, a notebook PC, or the like. The terminal 10A includes an operation unit 12A, a display unit 14A, a Wi-Fi interface 16A, a camera 18A and a controller 30A. The respective units 12A to 30A are connected to a bus line (reference sign omitted). Hereafter, an interface is referred to as "I/F".

The operation unit 12A includes a plurality of keys. A user can input various instructions to the terminal 10A by operating the operation unit 12A. The display unit 14A is a display configured to display various types of information. The camera 18A is a device to capture an object. In the present embodiment, the camera 18A is used to capture a QR Code (registered trademark) of the AP 6 and QR Codes displayed on printers (e.g., 100A).

The Wi-Fi I/F 16A is a wireless I/F configured to execute a Wi-Fi communication in conformity with the Wi-Fi standard. The Wi-Fi standard is a standard for executing wireless communication in accordance with the standard 802.11 of the Institute of Electrical and Electronics Engineers, Inc. (IEEE) and standards complying therewith (such as 802.11a, 11b, 11g, 11n, 11ac, etc.). The Wi-Fi I/F 16A supports a Device Provisioning Protocol (DPP) scheme established by the Wi-Fi Alliance. The details of the DPP scheme are described in the specification "Device Provisioning Protocol Technical Specification Version 1.1.13" created by the Wi-Fi Alliance.

The Wi-Fi I/F 16A further supports a Wi-Fi Direct (registered trademark) (WFD) scheme created by the Wi-Fi Alliance. The details of the WFD scheme are described in the specification "Wi-Fi Peer-to-Peer (P2P) Technical Specification Version1.1" created by the Wi-Fi Alliance. In the WFD scheme, a Group Owner state (hereafter referred to as "G/O state") and a client state (hereafter referred to as "CL state") are defined. The G/O state refers to a state of operating as a parent station in a wireless connection established in conformity with the WFD scheme, and the CL state refers to a state of operating as a child station in the wireless connection. Hereafter, a Wi-Fi connection established in conformity with the WFD scheme may be referred to as "WFD connection".

The terminal 10A also can establish a Wi-Fi connection with the AP 6 in conformity with an ordinary Wi-Fi scheme different from the DPP scheme and the WFD scheme (hereafter, this may be referred to as "supports an ordinary Wi-Fi scheme"). Specifically, in the ordinary Wi-Fi scheme, the terminal 10A can establish a Wi-Fi connection with the AP 6 by using a Service Set Identifier (SSID) and a password of a wireless network formed by the AP 6. A password is hereafter referred to as "PW".

The controller 30A includes a CPU 32A and a memory 34A. The CPU 32A is configured to execute various processes in accordance with programs 36A, 38A stored in the memory 34A. The memory 34A is constituted of a volatile memory, a nonvolatile memory, and the like.

An Operating System (OS) program 36A is a program to implement basic operations of the terminal 10A. An application 38A is a program to establish a Wi-Fi connection between the terminal 10A and the AP 6, establish a Wi-Fi connection between the printer (e.g., 100A) and the AP 6, and the like. Hereafter, an OS program and an application are hereafter referred to as "OS" and "app", respectively. The app 38A can establish a Wi-Fi connection between the terminal 10A and the AP 6 or between the printer (e.g., 100A) and the AP 6 by causing the OS 36A to execute a process in conformity with the DPP scheme. The app 38A may be installed on the terminal 10A from a server (not shown) on the Internet provided by, for example, a vendor of the printers 100A, 100B.

(Configuration of Terminal 10B)

The terminal 10B is a portable terminal device such as a cell phone (e.g., a smartphone), a PDA, a tablet PC, or the like. In a variant, the terminal 10B may be a stationary PC, a notebook PC, or the like. The terminal 10B includes an operation unit 12B, a display unit 14B, a Wi-Fi I/F 16B, a camera 18B and a controller 30B. The respective units 12B to 30B are connected to a bus line (reference sign omitted). The controller 30B includes a CPU 32B and a memory 34B. Configurations of the units 12B to 34B are the same as the configurations of the units 12A to 34A of the terminal 10A except that the Wi-Fi I/F 16B does not support the DPP scheme. In other words, the Wi-Fi I/F 16B supports the WFD scheme and the ordinary Wi-Fi scheme but does not support the DPP scheme.

(Configuration of Printer 100A)

The printer 100A is a peripheral device (e.g., a peripheral device of the terminal 10A) configured to execute a printing function. In a variant, the printer 100A may be a multifunction device configured to execute a scan function, a FAX function, and the like, as well as a printing function. The printer 100A has a printer ID "AAA". The printer 100A includes an operation unit 112A, a display unit 114A, and Wi-Fi I/F 116A, a print executing unit 118A and a controller 130A. The units 112A to 130A are connected to a bus line (reference sign omitted).

The operation unit 112A includes a plurality of keys. A user can input various instructions to the printer 100A by operating the operation unit 112A. The display unit 114A is a display configured to display various types of information. The print executing unit 118A includes a printing mechanism of an inkjet scheme, a laser scheme, or the like. The Wi-Fi I/F 116A is the same as the Wi-Fi I/F 16A of the terminal 10A. In other words, the Wi-Fi I/F 116A supports the DPP scheme, the WFD scheme, and the ordinary Wi-Fi scheme.

The controller 130A includes a CPU 132A and a memory 134A. The CPU 132A executes various processes in accordance with a program 136A stored in the memory 134A. The memory 134A is configured of a volatile memory, a non-volatile memory, and the like. The memory 134A stores a MAC address 140A of the Wi-Fi I/F 116A.

(Configuration of Printer 100B)

The printer 100B is a peripheral device (e.g., a peripheral device of the terminal 10A) configured to execute a printing function. In a variant, the printer 100B may be a multifunction device configured to execute a scan function, a FAX function, and the like, as well as a printing function. The printer 100B has a printer ID "BBB". The printer 100B includes an operation unit 112B, a display unit 114B, and Wi-Fi I/F 116B, a print executing unit 118B and a controller 130B. The units 112B to 130B are connected to a bus line (reference sign omitted). The controller 130B includes a CPU 132B and a memory 134B. Configurations of the units 112B to 134B are the same as the configurations of the units 112A to 134A of the printer 100A except that the Wi-Fi I/F 116B does not support the DPP scheme and that the memory 134B stores a MAC address 140B of the Wi-Fi I/F 116B. In other words, the Wi-Fi I/F 116B supports the WFD scheme and the ordinary Wi-Fi scheme but does not support the DPP scheme.

(Configuration of AP 6)

The AP 6 is not a device in the G/O state of the WFD but an ordinary access point called a wireless access point or a wireless LAN router. The AP 6 supports the DPP scheme and the ordinary Wi-Fi scheme. The AP 6 is configured to relay communication between a pair of devices belonging to a Wi-Fi network in which the AP 6 operates as a parent station.

The AP 6 stores a public key PKap, a private key pkap (not illustrated), a MAC address 8 of a Wi-Fi I/F (not illustrated) of the AP 6, channel information CI1, an SSID "S1", and a PW "P1". The public key PKap and the private key pkap are used in execution of authentication in conformity with the DPP scheme. The channel information CI1 is information indicating one or more of a plurality of channels (in other words, a width of a wavelength) available to the AP 6. A QR Code obtained by encoding the public key PKap, the MAC address 8 and the channel information CI1 is attached to a housing of the AP 6. The SSID "S1" is information to identify the Wi-Fi network formed by the AP 6. The PW "P1" is authentication information used to cause a device to participate in the Wi-Fi network.

Figure 2:
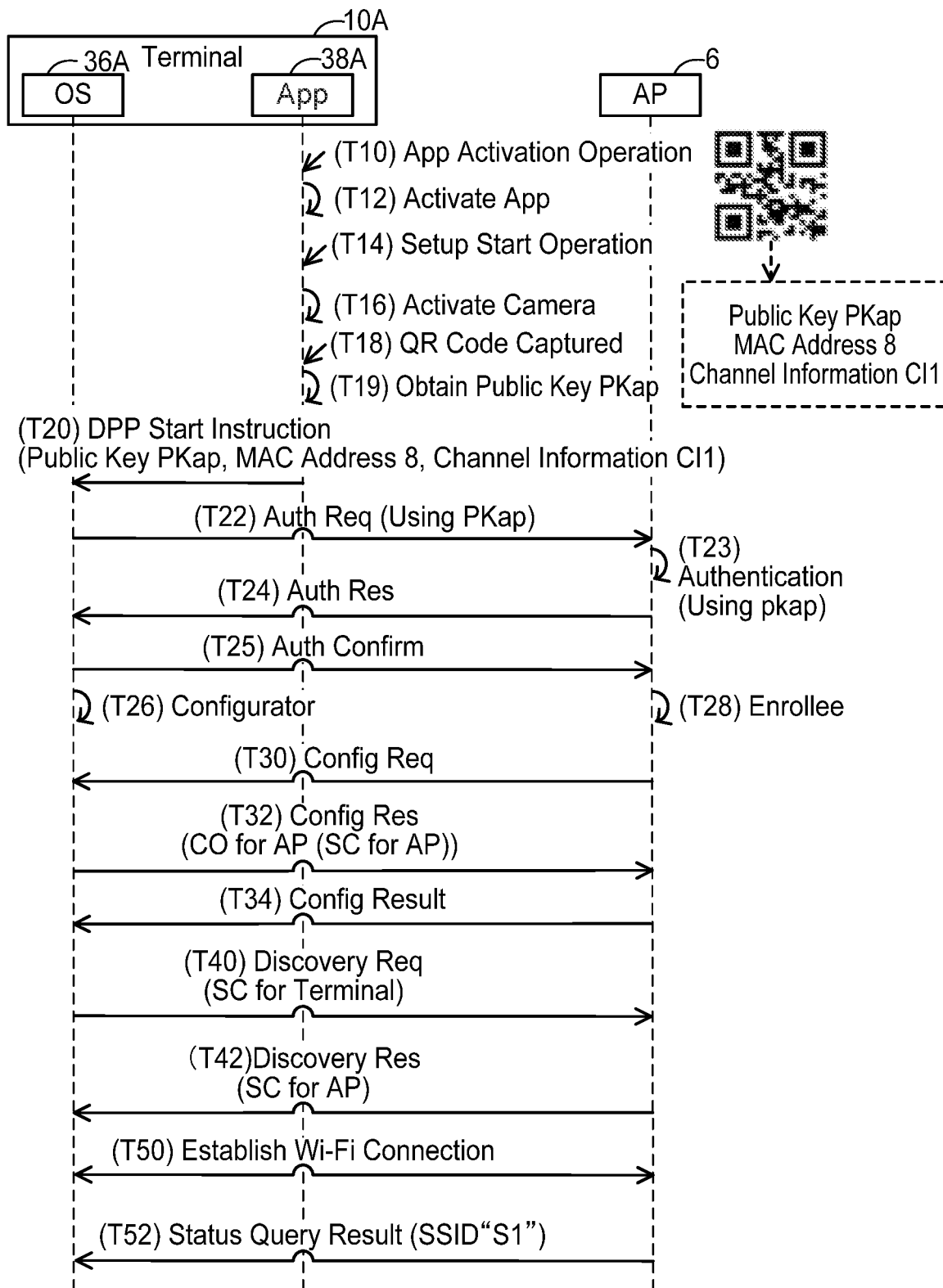
FIG. 2 illustrates a sequence diagram of a process executed by respective devices.

(Establishment of Wi-Fi Connection in Conformity with DPP Scheme Between Terminal 10A and AP 6; FIG. 2)

Next, with reference to FIG. 2, a process to establish a Wi-Fi connection in conformity with the DPP scheme between the terminal 10A and the AP 6 will be described. In the following descriptions of FIG. 2, for easier understanding, operations executed by a CPU (such as the CPUs 32A, 132A) of each device will be described with its corresponding device (such as the terminal 10A, printer 100A) as a subject of action instead of describing the operations with the CPU as the subject of action. Further, an OS (e.g., the OS 36A) or an app (e.g., the app 38A) may be described as the subject of action instead of describing its corresponding terminal (e.g., the terminal 10A) as the subject of action. All the communication executed by the terminals 10A, 10B and the printers 100A, 100B are executed via the Wi-Fi I/F 16A and the like. Thus, when communication is explained, a phrase "via the Wi-Fi I/F" is omitted. The same applies to explanations of FIGS. 4 to 8.

In T10, the app 38A accepts an operation to activate the app 38A from the user. Consequently, in T12, the app 38A is activated.

In T14, the app 38A accepts a setup start operation from the user. The term "setup" in the present embodiment means establishing a Wi-Fi connection between the terminal 10A and the AP 6 and then establishing a W-Fi connection between a printer and the AP 6. When the app 38A accepts the setup start operation, the app 38A activates the camera 18A in T16. In T18, the app 38A accepts an operation by the user to capture the QR Code attached to the housing of the AP 6 using the camera 18A.

In T19, the app 38A decodes the captured QR Code. Consequently, the app 38A obtains the public key PKap, the MAC address 8 and the channel information CI1. The process of T19 corresponds Bootstrapping of the DPP scheme.

When the app 38A obtains the public key PKap and the like, the app 38A supplies a DPP start instruction to the OS 36A in T20. The DPP start instruction includes the public key PKap, the MAC address 8 and the channel information CI1.

After the OS 36A obtains the DPP start instruction from the app 38A in T20, then in T22, the app 38A sends, to the AP 6, an Authentication Request in which the public key PKap included in the DPP start instruction is used with the MAC address 8 included in the DPP start instruction as a recipient. Hereafter, Authentication is referred to as "Auth" and a Request is referred to as "Req". Here, the OS 36A repeats sending of the Auth Req by sequentially using the one or more channels indicated by the channel information CI1 included in the DPP start instruction. As described above, since the OS 36A sends the Auth Req by using the channel(s) available to the AP 6, the OS 36A can suitably ensure that the AP 6 receives the Auth Req.

The Auth Req is a signal to request execution of authentication of the terminal 10A, which is a sender of the Auth Req. Specifically, the OS 36A first creates a shared key by using a private key (not illustrated) of the terminal 10A and the public key PKap of the AP 6, and creates encrypted data by encrypting a random value by using the shared key. Then, the OS 36A sends, to the AP 6, the Auth Req including a public key (not illustrated) of the terminal 10A, the encrypted data, and a Capability of the terminal 10A. The Capability of the terminal 10A includes a value that indicates that the terminal 10A is capable of operating only as a Configurator of the DPP scheme.

When the AP 6 receives the Auth Req from the terminal 10A in T22, the AP 6 executes authentication of the encrypted data included in the Auth Req in T23. Specifically, the AP 6 generates a shared key by using the public key of the terminal 10A included in the Auth Req and the private key pkap of the AP 6 and decrypts the encrypted data by using the shared key. When the decryption of the encrypted data is successful, the AP 6 determines that the authentication is successful and executes processes T24 and after.

In T24, the AP 6 sends an Auth Response including a Capability of the AP 6 to the terminal 10A. Hereafter, a Response is referred to as "Res". The Capability of the AP 6 includes a value that indicates that the AP 6 is capable of operating only as an Enrollee of the DPP scheme.

When the OS 36A receives the Auth Res from the AP 6 in T24, the OS 36A determines that the Capability of the AP 6 included in the Auth Res (i.e., Enrollee) does not conflict with the Capability of the terminal 10A itself (i.e., Configurator). Then, in T25, the OS 36A sends an Auth Confirm to the AP 6. The Auth Confirm includes information indicating that the terminal 10A operates as the Configurator and the AP 6 operates as the Enrollee. Consequently, the OS 36A determines to operate as the Configurator in T26. The Configurator is a device that plays a role of sending a Configuration Object to be described (hereafter described as "CO") to the Enrollee.

In T28, the AP 6 determines to operate as the Enrollee. The Enrollee is a device that plays a role of receiving the CO from the Configurator. The processes of T22 to T28 correspond to Auth of the DPP scheme.

In T30, the AP 6 sends a Configuration Req to the terminal 10A. Hereafter, a Configuration is described as "Config". The Config Req is a signal to request for sending of a CO.

When the OS 36A receives the Config Req from the AP 6 in T30, the OS 36A generates a CO for AP. Specifically, the OS 36A first generates a Signed Connector (described as "SC" hereafter) for an AP that is information to be used by the AP 6 to establish a Wi-Fi connection. The SC for AP includes for example a group ID which is an identifier to identify a wireless network. Then, the OS 36A generates the CO for AP including the SC for AP and sends a Config Res including the CO for AP to the AP 6 in T32.

When the AP 6 receives the Config Res from the terminal 10A in T32, the AP 6 sends a Config Result to the terminal 10A in T34. The Config Result includes a code "STATUS_OK" indicating that the Config was successful. The processes of T30 to T34 correspond to Config of the DPP scheme.

Next, the OS 36A generates a SC for terminal which is information to be used by the terminal 10A to establish a Wi-Fi connection. The SC for terminal includes the same group ID as the group ID included in the SC for AP. In T40, the OS 36A sends a Discovery Req including the SC for terminal to the AP 6. The Discovery Req is a signal requesting for sending of a SC of a counterpart.

When the AP 6 receives the Discovery Req from the terminal 10A in T40, the AP 6 executes authentication of the SC for terminal included in the Discovery Req by using the SC for AP. When the authentication of the SC for terminal is successful, the AP 6 generates a connection key. Then, the AP 6 sends a Discovery Res including the SC for AP to the terminal 10A in T42.

When the OS 36A receives the Discovery Res from the AP 6 in T42, the OS 36A executes authentication of the SC for AP included in the Discovery Res by using the SC for terminal. When the authentication of the SC for AP is successful, the OS 36A generates a connection key. The connection key generated here is the same as the connection key generated by the AP 6. In other words, the connection key is shared by the terminal 10A and the AP 6. The processes of T40 and T42 correspond to Network Access of the DPP scheme.

Next, the OS 36A uses the connection key to execute 4way-handshake communication with the AP 6. Consequently, in T50, a Wi-Fi connection is established between the terminal 10A and the AP 6. As such, a wireless network in which the AP 6 operates as a parent station is formed and the terminal 10A participates in the wireless network as a child station.

Next, the AP 6 sends a Status Query Result (hereafter described as "Result") to the terminal 10A in T52. The Result includes information indicating that the Wi-Fi connection between the terminal 10A and the AP 6 has been established and the SSID "S1" of the AP 6.

By receiving the Result from the AP 6 in T52, the OS 36A obtains the SSID "S1" of the AP 6.

Figure 3:
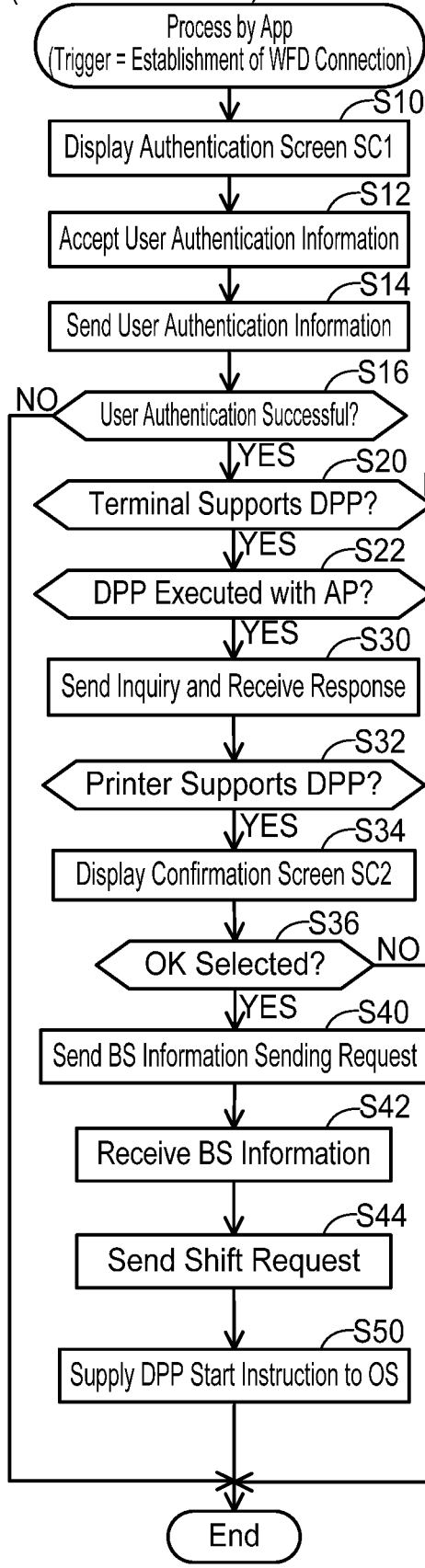
FIG. 3 illustrates a flowchart of a process executed by an application of a first embodiment.

(Process by App; FIG. 3)

Next, a process executed by an app (e.g., the app 38A) installed on a terminal (e.g., the terminal 10A) will be described with reference to FIG. 3. The process of FIG. 3 is triggered by establishment of a WFD connection between a terminal and a printer in response to a preliminary process executed in the terminal and the printer. The preliminary process will be explained later with reference to FIG. 4. Hereafter, the terminal and the printer in which a WFD connection is established are referred to as "target terminal" and "target printer", respectively. Further, in the explanation of the process of FIG. 3, not a CPU of the target terminal but an app installed on the target terminal (hereafter referred to as "target app") is described as a subject of the process.

In the initial state of FIG. 3, a Wi-Fi connection has been established between the target terminal and the AP 6. Here, the Wi-Fi connection established between the target terminal and the AP 6 is either a Wi-Fi connection in conformity with the DPP scheme or a Wi-Fi connection in conformity with the ordinary Wi-Fi scheme. When the target terminal has established the Wi-Fi connection in conformity with the DPP scheme with the AP 6, it already has the SSID "S1" of the AP 6 stored in the memory (see T52 of FIG. 2). In addition, when the target terminal has established the Wi-Fi connection in conformity with the ordinary Wi-Fi scheme with the AP 6 as well, the target terminal already has the SSID "S1" of the AP 6 stored in the memory. In other words, the target terminal has the SSID "S1" of the AP 6 stored in the memory when the Wi-Fi connection, in conformity with either the DPP scheme or the ordinary Wi-Fi scheme, has been established with the AP 6.

In S10, the target app causes a display unit of the target terminal to display an authentication screen SC1. The authentication screen SC1 includes a message that prompts input of a username and a PW to login to the target printer, an area to input the username, an area to input the PW, an OK button and a cancel button. A combination of the username and the PW will hereafter be referred to as "user authentication information".

In S12, the target app accepts input of the user authentication information from the user. Specifically, the target app accepts, from the user, input of the username and the PW and then accepts selection of the OK button on the authentication screen SC1.

In S14, the target app sends the user authentication information inputted in S12 to the target printer by using the established WFD connection.

In S16, the target app determines whether the user authentication was successful. Specifically, authentication of the user authentication information is at first executed in the target printer in response to the user authentication information being sent to the target printer in S14. The authentication succeeds when the user authentication information is stored in the target printer, while the authentication fails when the user authentication information is not stored in the target printer. When the target app receives, from the target printer, information which indicates that the authentication was successful by using the established WFD connection, it determines that the user authentication was successful (YES in S16) and proceeds to S20. On the other hand, when the target app receives, from the target printer, information which indicates that the authentication failed by using the established WFD connection, it determines that the user authentication failed (NO in S16) and terminates the process of FIG. 3 without executing processes of S20 and after.

If a configuration which does not execute the authentication of the user authentication information is employed, a third party who is not an authorized user of the target printer may establish a Wi-Fi connection between the target printer and the AP. In the present embodiment, the processes of S20 and after are executed only when the authentication of the user authentication information is successful. Thus, establishment of the Wi-Fi connection between the target printer and the AP by the third party can be prevented. Consequently, security of the target printer can be increased.

In S20, the target app determines whether the target terminal supports the DPP scheme. Specifically, the memory of the target terminal stores information (not illustrated) that indicates whether the Wi-Fi I/F of the target terminal supports the DPP scheme. When the information that indicates the target terminal supports the DPP scheme is stored in the memory, the target app determines YES in S20 and proceeds to S22. On the other hand, when the information is not stored in the memory, the target app determines NO in S20 and proceeds to S60.

In S22, the target app determines whether respective sets of communication in conformity with the DPP scheme (i.e., T22 to T52 of FIG. 2) have been executed between the target terminal and the AP 6. Specifically, when the respective sets of communication in conformity with the DPP scheme have been executed between the target terminal and the AP 6, the memory of the target terminal stores the information (e.g., the CO for AP) indicating that the respective sets of communication have been executed. When the information is stored in the memory, the target app determines YES in S22 and proceeds to S30. On the other hand, when the information is not stored in the memory, the target app determines NO in S22 and proceeds to S60.

In S30, the target app sends an inquiry to the target printer by executing communication at a network layer or above of an Open System Interconnection (OSI) reference model by using the WFD connection. The inquiry is a signal to inquire whether the target printer supports the DPP scheme and also inquire a printer ID, function information and a current status of the target printer. The function information is information which indicates functions the target printer can execute (e.g., color printing, double-sided printing).

In S30, the target app further uses the WFD connection to receive a response from the target printer. The response includes information indicating whether the target printer supports the DPP scheme, the printer ID, the function information, and the status.

In S32, the target app determines whether the target printer supports the DPP scheme. Specifically, when the target app receives a response including the information indicating that the target printer supports the DPP scheme, the target app determines YES in S32 and proceeds to S34. On the other hand, when the target app receives a response including the information indicating that the target printer does not support the DPP scheme, the target app determines NO in S32 and proceeds to S62.

In S34, the target app causes the display unit of the target terminal to display a confirmation screen SC2. The confirmation screen SC2 is a screen to ask the user whether to execute a process to establish a Wi-Fi connection between the target printer and the AP 6, and includes the information received in S30 (i.e., the printer ID, the function information and the status), an OK button, and a cancel button. By viewing the confirmation screen SC2, the user can check information of a printer (i.e., the target printer) with which a Wi-Fi connection with the AP 6 is to be established.

In S36, the target app determines whether the OK button in the confirmation screen SC2 is selected or the cancel button is selected. When the OK button is selected, the target app determines YES in S36 and proceeds to S40. When the cancel button is selected, the target app determines NO in S36 and terminates the process of FIG. 3 without executing the processes of S40 and after.

In S40, the target app sends a BS information sending request to the target printer by executing communication at the network layer or above of the OSI reference model by using the WFD connection. The BS information sending request is a signal to request the target printer to send BS information used in the respective sets of communication (e.g., Auth) in conformity with the DPP scheme.

In S42, the target app receives the BS information from the target printer by executing the communication at the network layer or above by using the WFD connection. The BS information includes a public key of the target printer, a MAC address of the target printer and the channel information. Consequently, the target printer can obtain the public key of the target printer. The processes of S40 and S42 correspond to the Bootstrapping of the DPP scheme.

In S44, the target app sends a shift request to the target printer by executing the communication at the network layer or above by using the WFD connection. The shift request is a signal to request for shifting a status of the target printer from a DPP non-respondent state to a DPP respondent state. Here, the DPP non-respondent state is a state incapable of sending an Auth Res, and the DPP respondent state is a state capable of sending the Auth Res. Consequently, the target printer can send the Auth Res to the target terminal in response to receiving the Auth Req from the target terminal. Further, the DPP respondent state is normally a state in which processing load on a printer is higher as compared to the DPP non-respondent state. Since the shift request is sent to the target printer at a timing when the Auth is about to be executed and then the target printer shifts to the DPP respondent state, the processing load on the printer can thereby be reduced.

In S50, the target app supplies a DPP start instruction to the OS of the target terminal. The DPP start instruction includes the BS information received in S42. When the DPP start instruction is obtained by the OS, the respective sets of communication in conformity with the DPP scheme are executed between the target terminal and the target printer and between the target printer and the AP 6, and a Wi-Fi connection in conformity with the DPP scheme is established between the target printer and the AP 6. When the process of S50 is completed, the process of FIG. 3 is terminated.

In S60, the target app sends an inquiry to the target printer and receives a response from the target printer by executing the communication at the network layer or above by using the WFD connection. The inquiry is the same as the inquiry send in S30 except that the inquiry of S60 does not inquire whether the target printer supports the DPP scheme. Further, the response received in S60 is the same as the response received in S30 except that the response of S60 does not include the information indicating whether the target printer supports the DPP scheme.

In S62, the target app causes the display unit of the target terminal to display the confirmation screen SC2. In S62 executed after S30, the target app causes the display unit to display the confirmation screen SC2 including the information received in S30 (i.e., the printer ID, the function information and the status). In S62 executed after S60, the target app causes the display unit to display the confirmation screen SC2 including the information received in S60 (i.e., the printer ID, the function information and the status).

In S64, the target app determines whether the OK button in the confirmation screen SC2 is selected or the cancel button is selected. When the OK button is selected, the target app determines YES in S64 and proceeds to S66. When the cancel button is selected, the target app determines NO in S64 and terminates the process of FIG. 3 without executing the processes of S66 and after.

In S66, the target app obtains the SSID "S1" of the AP 6. Specifically, the target app obtains the SSID "S1" of the AP 6 from the OS by supplying an SSID request to the OS of the target terminal.

In S70, the target app causes the display unit of the target terminal to display an input screen SC3. The input screen SC3 includes a message that requests input of the PW, the SSID "S1" obtained in S66, an area to input the PW, an OK button and a cancel button (see FIG. 6).

In S72, the target app determines whether input of the PW has been accepted. Specifically, when the target app accepts input of the PW and selection of the OK button in the input screen SC3, the target app determines YES in S72 and proceeds to S74. On the other hand, when the target app accepts selection of the cancel button on the input screen SC3, the target app determines NO in S72 and terminates the process of FIG. 3 without executing the process of S74.

In S74, the target app sends the SSID obtained in S66 and the PW inputted in S72 to the target printer by using the WFD connection. As a result of the SSID and the PW being used in the target printer, a Wi-Fi connection in conformity with the ordinary Wi-Fi scheme is established between the target printer and the AP 6. When the process of S74 is completed, the process of FIG. 3 is terminated.

Figure 4:
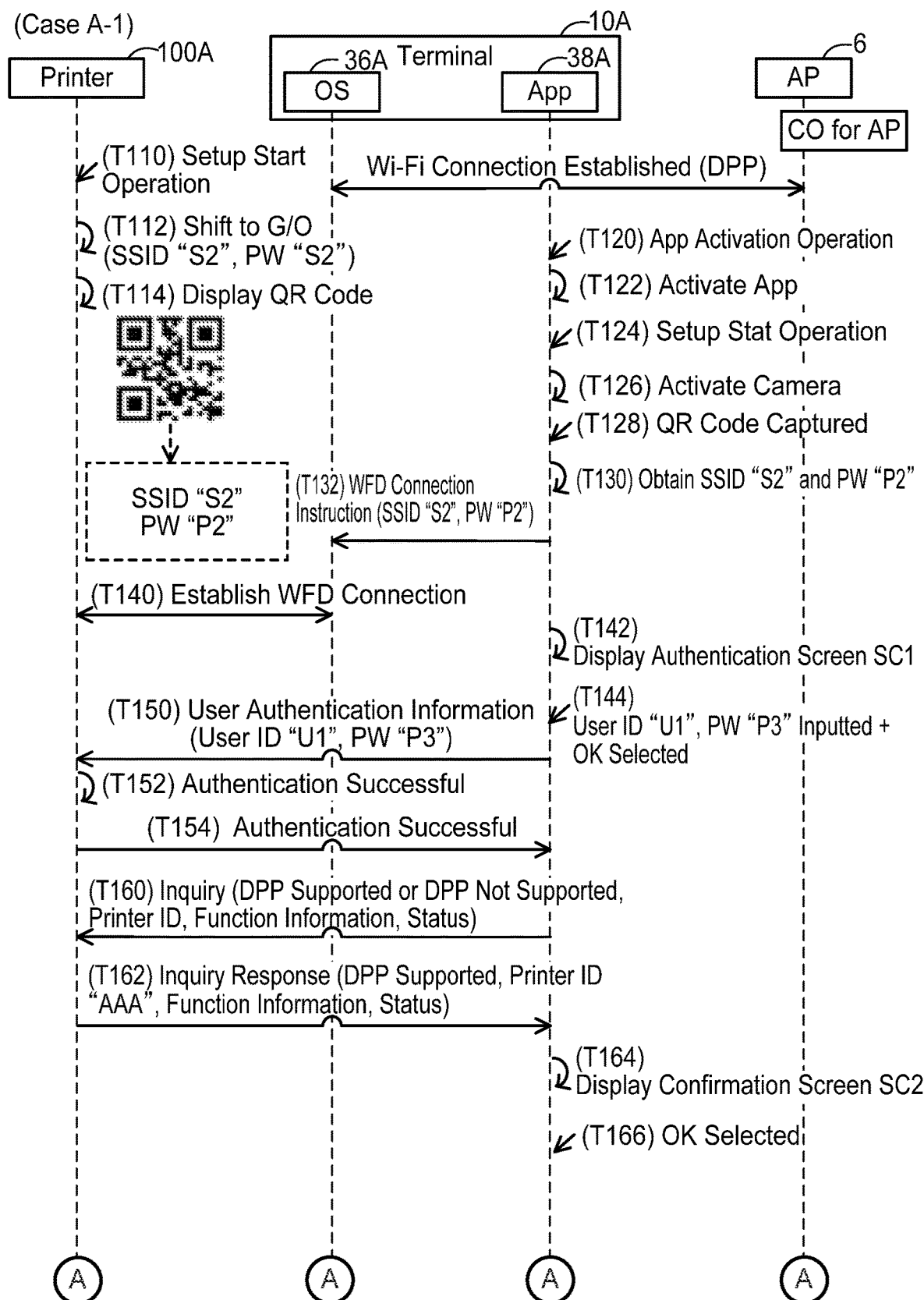
FIG. 4 illustrates a sequence diagram of Case A-1.
Figure 5:
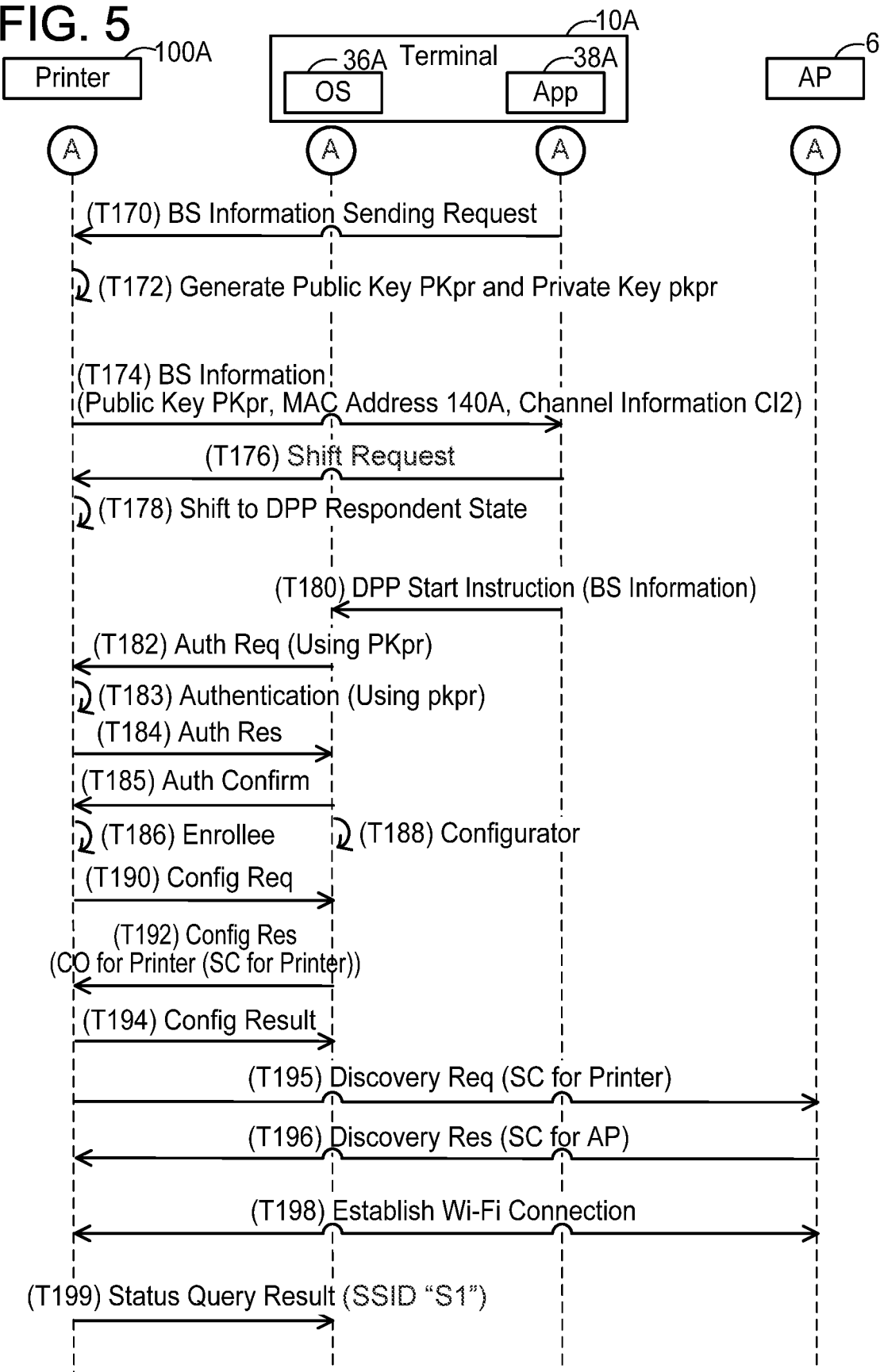
FIG. 5 illustrates a sequence diagram continued from FIG. 4.

(Case A-1; FIG. 4 and FIG. 5)

Next, specific cases implemented by the process of FIG. 3 will be described. First, with reference to FIG. 4 and FIG. 5, Case A-1 in which a Wi-Fi connection is established between the printer 100A and the AP 6 by using the terminal 10A that has the Wi-Fi connection in conformity with the DPP scheme established with the AP 6 will be described. In the initial state of FIG. 4, the Wi-Fi connection in conformity with the DPP scheme has been established between the terminal 10A and the AP 6. In other words, in the initial state of FIG. 4, the process of FIG. 2 has been executed in the terminal 10A and the AP 6, thus the AP 6 already stores the CO for AP (see T32 of FIG. 2). In FIG. 4, the preliminary processes of T110 to T140 are at first executed.

In T110, the printer 100A accepts the setup start operation from the user. In this case, the printer 100A shifts to the G/O state of the WFD scheme in T112. In a wireless network in which the printer 100A operates in the G/O state, an SSID "S2" and a PW "P2" are used. As described above, since the printer 100A shifts to the G/O state in response to accepting the setup start operation from the user, the printer 100A can shift to the G/O state at a timing the user wishes.

In T114, the printer 100A displays, on the display unit 114A, a QR Code obtained by encoding the SSID "S2" and the PW "P2".

The processes of T120 to T126 are the same as the processes of T10 to T16 of FIG. 2. Further, the process of T128 is the same as the process of T18 of FIG. 2 except that the QR Code captured by the terminal 10A is the QR Code displayed in T114.

In T130, the app 38A decodes the captured QR Code. Consequently, the app 38A obtains the SSID "S2" and the PW "P2".

In T132, the app 38A supplies a WFD connection instruction to the OS 36A. The WFD connection instruction includes the SSID "S2" and the PW "P2".

When the OS 36A obtains the WFD connection instruction from the app 38A in T132, the OS 36A establishes a WFD connection with the printer 100A in T140. Specifically, the 0S36A executes respective sets of communication such as the Authentication, Association, 4-way handshake with the printer 100A. In the process of the respective sets of communication, authentication using the SSID "S2" and the PW "P2" is executed in the printer 100A, and when the authentication succeeds a WFD connection is established between the terminal 10A and the printer 100A. As described above, the QR Code in which the SSID "S2" and the PW "P2" are encoded is displayed by the printer 100A, and the QR Code is read by the terminal 10A. Consequently, the WFD connection is suitably established between the terminal 10A and the printer 100A. Although not illustrated, when the WFD connection is established between the terminal 10A and the printer 100A, information indicating that the WFD connection has been established is supplied from the OS 36A to the app 38A. Further, all the communication described below in which a WFD connection is used is communication at the network layer or above of the OSI reference model.

When the app 38A obtains, from the OS 36A, the information indicating that the WFD connection has been established (trigger of the process of FIG. 3), the app 38A displays the authentication screen C1 (see FIG. 3) in T142 (S10).

In T144, the app 38A accepts input of a user ID "U1" and a PW "P3" from the user and then accepts selection of the OK button (S12). In this case, the app 38A sends user authentication information including the inputted user ID "U1" and the PW "P3" to the printer 100A by using the WFD connection in T150 (S14).

When the printer 100A receives the user authentication information from the terminal 10A in T150, the printer 100A executes authentication of the user authentication information. In the present case, the printer 100A determines that the authentication was successful in T152, and sends, to the terminal 10A, information indicating that the authentication was successful by using the WFD connection in T154.

When the app 38A receives the information indicating that the authentication was successful from the printer 100A in T154 (YES in S16), the app 38A sends an inquiry to the printer 100A by using the WFD connection in T160 (S30) since the terminal 10A supports the DPP scheme (YES in S20) and the respective sets of communication in conformity with the DPP scheme have been executed between the terminal 10A and the AP 6 (YES in S22).

When the printer 100A receives the inquiry from the terminal 10A in T160, the printer 100A sends a response to the terminal 10A by using the WFD connection in T162. This response includes the information indicating that the printer 100A supports the DPP scheme and the information of the printer 100A (i.e., the printer ID "AAA", the function information and the status).

When the app 38A receives the response from the printer 100A in T162 (S30), the app 38A determines that the printer 100A supports the DPP scheme (YES in S32) and displays the confirmation screen SC2 (see FIG. 3) in T164 (S34). Thereafter, the app 38A accepts selection of the OK button in the confirmation screen SC2 from the user in T166 (YES in S36).

(Continuation of FIG. 4; FIG. 5)

In T170 of FIG. 5, the app 38A sends the BS information sending request to the printer 100A by using the WFD connection (S40 of FIG. 3).

When the printer 100A receives the BS information sending request from the terminal 10A in T170, the printer 100A generates a public key PKpr and a private key pkpr of the printer 100A by using the MAC address 140A of the printer 100A in T172. Consequently, the printer 100A does not need to store the public key PKpr or the private key pkpr until the printer 100A receives the BS information sending request from the terminal 10A. Then, the printer 100A sends the BS information including the public key PKpr, the MAC address 140A and a channel information CI2 to the terminal 10A by using the WFD connection in T174. The channel information CI2 is information indicating one or more channels among a plurality of channels (i.e., a width of a wavelength) available to the printer 100A.

When the app 38A receives the BS information from the printer 100A in T174 (S42), the app 38A sends a shift request to the printer 100A by using the WFD connection in T176 (S44).

When the printer 100A receives the shift request from the terminal 10A in T176, the printer 100A shifts its state from the DPP non-respondent state to the DPP respondent state in T178.

The app 38A supplies the DPP start instruction to the OS 36A in T180 (S50). The DPP start instruction includes the BS information.

The processes of T182 to T196 are the same as the processes of T22 to T42 of FIG. 2 except that subjects which execute the processes are different and information used in the processes is different. In particular, by virtue of the OS 36A sending the Auth Req by using the channel(s) available to the printer 100A, the OS 36A can cause the printer 100A to suitably receive the Auth Req. After the processes of T182 to T196, the Wi-Fi connection in conformity with the DPP scheme is established between the printer 100A and the AP 6 in T198. The process of T199 is the same as the process of T52 except that the subject of the process is different.

Due to the processes described above, both the terminal 10A and the printer 100A participate in the wireless network formed by the AP 6. Consequently, the printer 100A can receive printing data from the terminal 10A via the AP 6 and execute printing of the printing data.

Figure 6:
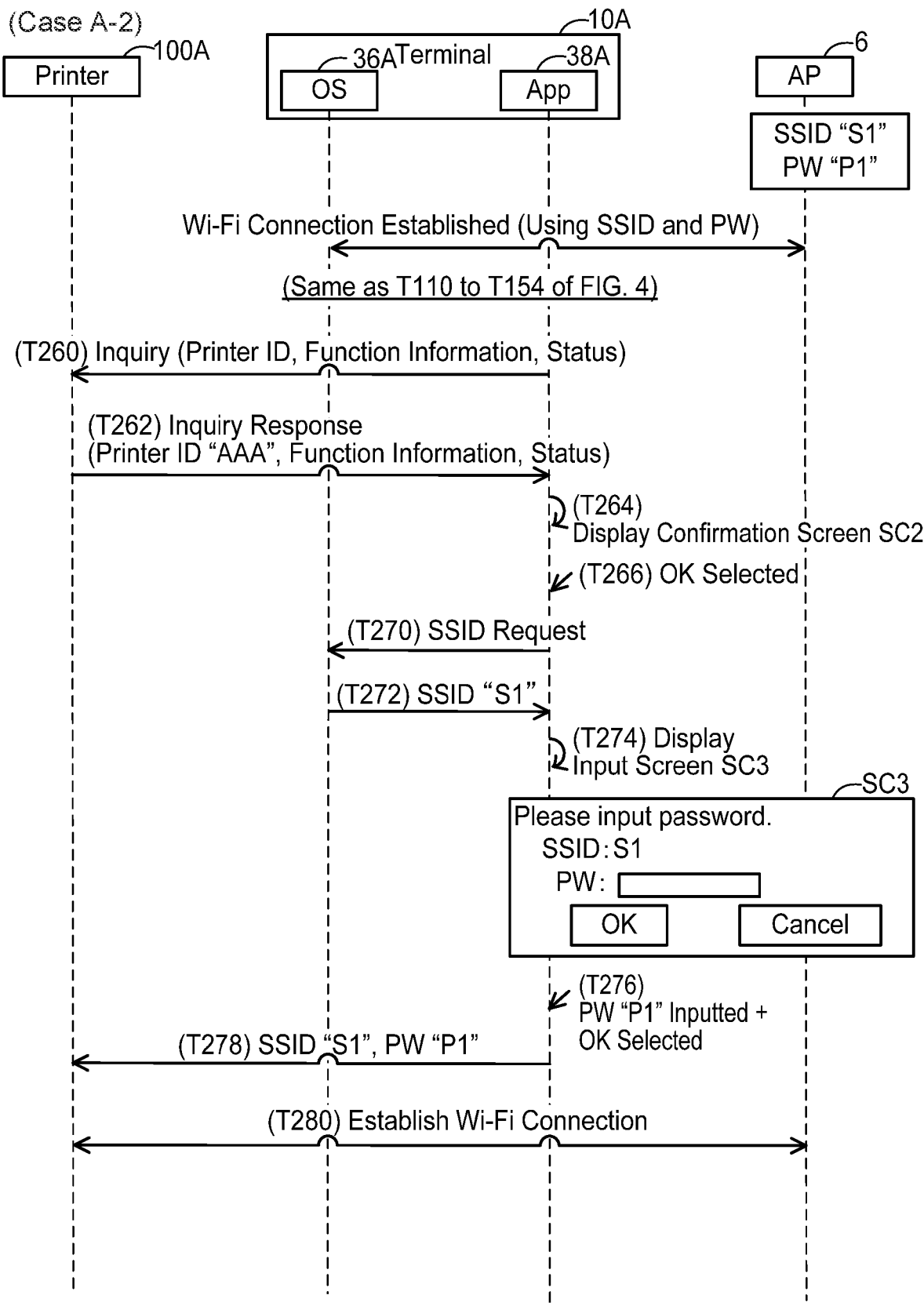
FIG. 6 illustrates a sequence diagram of Case A-2.

(Case A-2; FIG. 6)

Next, with reference to FIG. 6, Case A-2 in which a Wi-Fi connection is established between the printer 100A and the AP 6 by using the terminal 10A that has the Wi-Fi connection in conformity with the ordinary Wi-Fi scheme established with the AP 6 will be described. The initial state of FIG. 6 is the same as the initial state of FIG. 4 except that the Wi-Fi connection in conformity with the ordinary Wi-Fi scheme has been established between the terminal 10A and the AP 6. In other words, in the initial state of FIG. 6, the process of FIG. 2 has not been executed, and the Wi-Fi connection in which the SSID "S1" and the PW "P1" are used is established between the terminal 10A and the AP 6.

In FIG. 6, the same processes as T110 to T154 are at first executed. Then, when the app 38A receives, from the printer 100A, information indicating that the authentication was successful in T154 referred to in FIG. 6 (YES in S16 of FIG. 3), the app 38A sends the inquiry to the printer 100A by using the WFD connection in T260 (S60), since the terminal 10A supports the DPP scheme (YES in S20) and the respective sets of communication in conformity with the DPP scheme have not been executed between the terminal 10A and the AP 6 (NO in S22).

When the printer 100A receives the inquiry from the terminal 10A in T260, the printer 100A sends a response to the terminal 10A by using the WFD connection in T262. This response is the same as the response sent in T162 of FIG. 4 except that the response of T262 does not include information indicating whether the printer 100A supports the DPP scheme. The processes of T264 and T266 are the same as the processes of T164 and T166.

The app 38A supplies the SSID request to the OS 36A in T270.

When the OS 36A obtains the SSID request from the app 36A in T270, the OS 36A supplies, in T272 to the app 38A, the SSID "S1" of the AP 6 with which the terminal 10A currently has the Wi-Fi connection established. Consequently, the app 38A obtains the SSID "S1" of the AP 6 (S66).

The app 38A displays the input screen SC3 in T274 (S70). The input screen SC3 includes the SSID "S1" obtained in T272.

The app 38A accepts input of the PW "P1" from the user and then accepts selection of the OK button in T276 (YES in S72). In this case, the app 38A sends the SSID "S1" and the PW "P1" to the printer 100A by using the WFD connection in T278 (S74).

The printer 100A receives the SSID "S1" and the PW "P1" from the terminal 10A in T278. Consequently, the printer 100A establishes a Wi-Fi connection in conformity with the ordinary Wi-Fi with the AP 6 in T280. Specifically, the printer 100A executes the respective sets of communication such as the Authentication, Association, 4-way handshake with the AP 6. In the process of the respective sets of communication, authentication using the SSID "S1" and the PW "P1" is executed in the AP 6, and when the authentication is successful, a WFD connection in conformity with the ordinary Wi-Fi scheme is established between the printer 100A and the AP 6. In the present case as well, both the terminal 10A and the printer 100A can participate in the wireless network formed by the AP 6.

Figure 7:
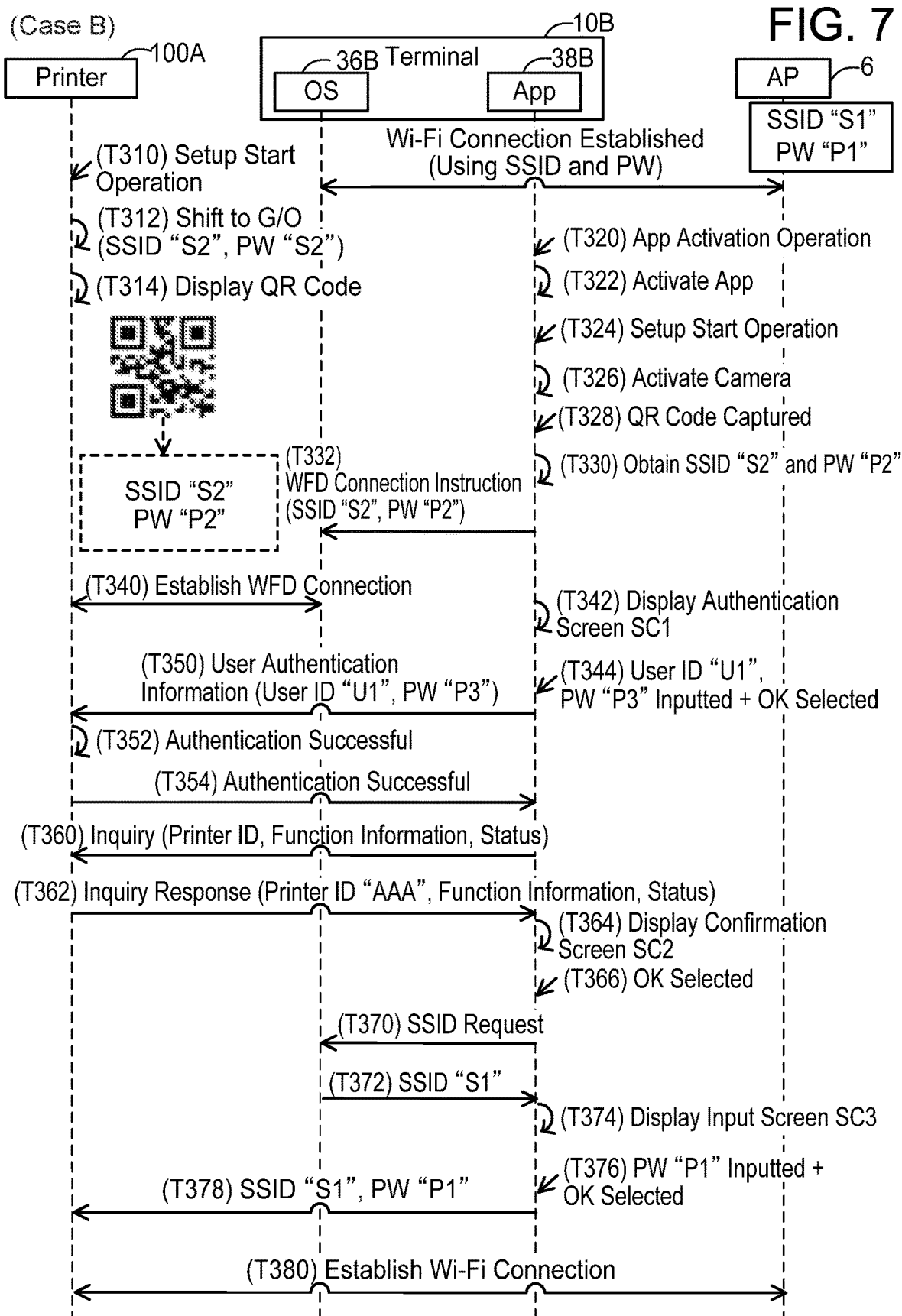
FIG. 7 illustrates a sequence diagram of Case B.

(Case B; FIG. 7)

Next, with reference to FIG. 7, Case B in which a Wi-Fi connection is established between the printer 100A and the AP 6 by using the terminal 10B that has the Wi-Fi connection in conformity with the ordinary Wi-Fi scheme established with the AP 6 will be described. The processes of T310 to T354 are the same as the processes of T110 to T154 of FIG. 4.

When the app 38B receives the information indicating that the authentication was successful from the printer 100A in T354 (YES in S16 of FIG. 3), the app 38B sends the inquiry to the printer 100A in T360 (S60) since the terminal 10B does not support the DPP scheme (NO in S20). The processes of T360 to T380 are the same as the processes of T260 to T280 of FIG. 6. In the present case, both the terminal 10B and the printer 100A can participate in the wireless network formed by the AP 6.

Figure 8:
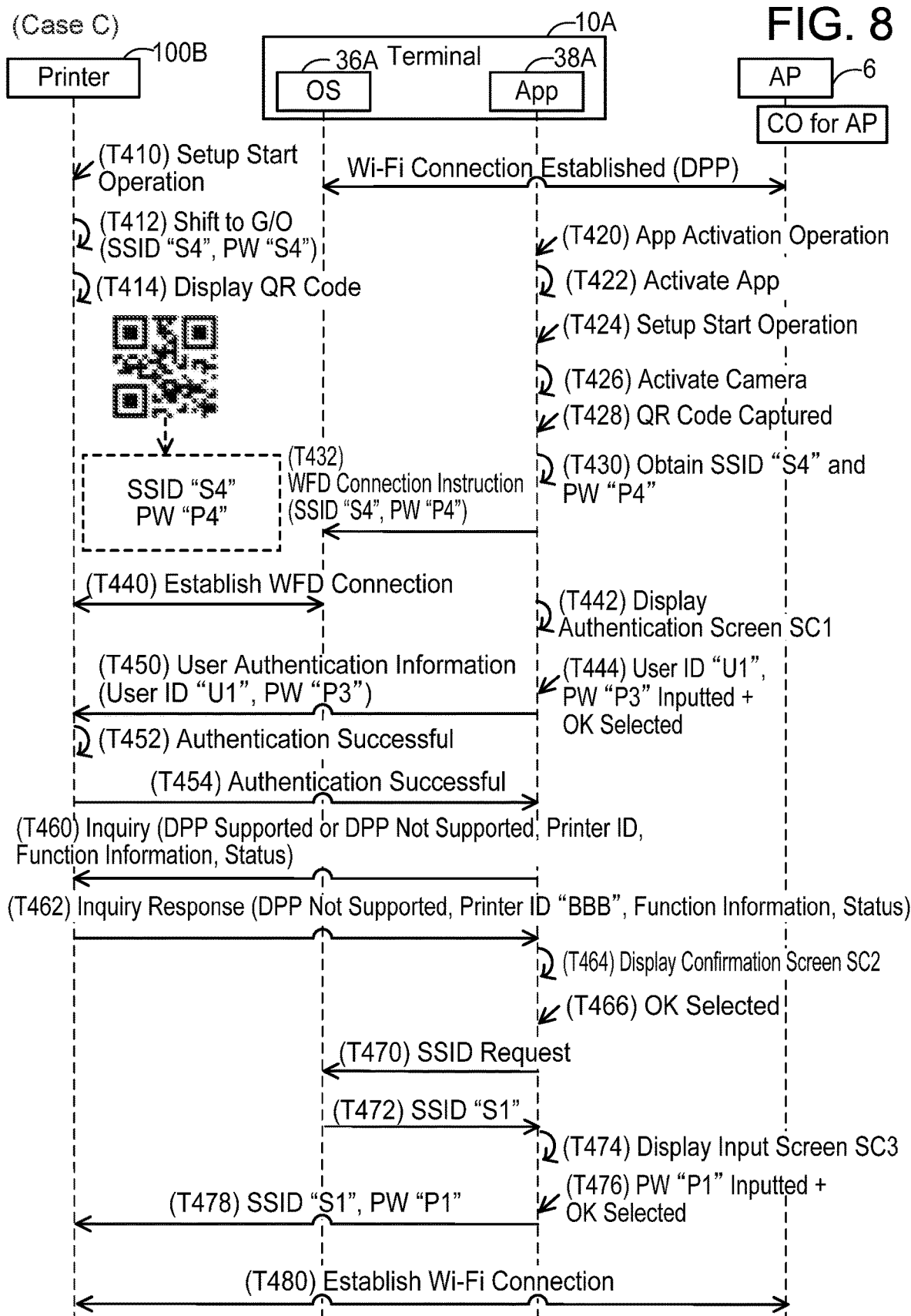
FIG. 8 illustrates a sequence diagram of Case C.

(Case C; FIG. 8)

Next, with reference to FIG. 8, Case C in which a Wi-Fi connection is established between the printer 100B and the AP 6 by using the terminal 10A that has the Wi-Fi connection in conformity with the DPP scheme established with the AP 6 will be described. The processes of T410 to T460 are the same as the processes of T110 to T160 of FIG. 4 except that the an SSID and a PW used to establish a WFD connection between the terminal 10A and the printer 100B are respectively an SSID "S4" and a PW "P4". Further, the process of T462 is the same as the process of T162 except that a response therein includes information indicating that the printer 100B does not support the DPP scheme and the information of the printer 100B (i.e., the printer ID "BBB", the function information, and the status).

When the app 38A receives the response from the printer 100B in T462 (S30), the app 38A determines that the printer 100B does not support the DPP scheme (NO in S32) and displays the confirmation screen SC2 in T464 (S62). The processes of T466 to T480 are the same as the processes of T266 to T280 of FIG. 6. In the present case, both the terminal 10A and the printer 100B can participate in the wireless network formed by the AP 6.

(Effect of Present Embodiment)

According to the above configuration, the terminal 10A can establish the Wi-Fi connection in conformity with the DPP scheme between the printer 100A and the AP 6 by executing the respective sets of communication in conformity with the DPP scheme with the printer 100A that supports the DPP scheme (T182 to T196 of FIG. 5). In addition, the terminal 10A can establish the Wi-Fi connection in conformity with the ordinary Wi-Fi scheme between the printer 100B and the AP 6 by executing the respective sets of communication in conformity with the ordinary Wi-Fi scheme with the printer 100B that does not support the DPP scheme. As described above, the terminal 10A can establish a Wi-Fi connection in conformity with a suitable scheme between the AP 6 and each of the printers 100A, 100B.

Further, the printer 100A establishes the Wi-Fi connection with the AP 6 in conformity with the DPP scheme (T198) by receiving the CO for printer including the SC for printer (T192 of FIG. 5). On the other hand, the printer 100A establishes the Wi-Fi connection with the AP 6 in conformity with the ordinary Wi-Fi scheme (T380) by receiving the SSID "S1" and the PW "P1" of the wireless network formed by the AP 6 from the terminal 10B that does not support the DPP scheme (T378 of FIG. 7). In particular, the printer 100A receives the CO for printer including the SC for printer from the terminal 10A that supports the DPP scheme and receives the SSID "S1" and the PW "P1" from the terminal 10B that does not support the DPP scheme. As described above, the printer 100A can establish the Wi-Fi connection in conformity with the suitable scheme between the printer 100A and the AP 6 by using the terminal 10A or 10B.

In particular, the printer 100A can establish the Wi-Fi connection with the AP 6 in conformity with the DPP scheme (Case A-1 in FIGS. 4 and 5), and also establish the Wi-Fi connection with the AP 6 in conformity with the ordinary Wi-Fi scheme (Case A-2 in FIG. 6). Then, when the Wi-Fi connection in conformity with the DPP scheme can be established between the printer 100A and the AP 6, the app 38A prioritizes establishment of the Wi-Fi connection in conformity of the DPP scheme (i.e., executes S34 to S50 in the case of YES in S32 of FIG. 3). As described above, in the DPP scheme, the user does not need to execute input of a PW. As such, prioritizing establishment of the Wi-Fi connection in conformity with the DPP scheme may reduce operations to be performed by the user, by which user convenience may be enhanced.

Further, a comparative example is assumed in which the user is prompted to execute the respective sets of communication in conformity with the DPP scheme between the terminal 10A and the AP 6 when such respective sets of communication in conformity with the DPP scheme between the terminal 10A and the AP 6 have not been executed. In this comparative example, various processes to establish the Wi-Fi connection between the printer 100A and the AP 6 are interrupted to execute the respective sets of communication in conformity with the DPP scheme between the terminal 10A and the AP 6. Consequently, a relatively long period is required to establish the Wi-Fi connection between the printer 100A and the AP 6. To the contrary, in the embodiment disclosed herein, the Wi-Fi connection is established between the printer 100A and the AP 6 in conformity with the ordinary Wi-Fi scheme when the respective sets of communication in conformity with the DPP scheme have not been executed between the terminal 10A and the AP 6 (NO in S22 of FIG. 3). Accordingly, it is not necessary to interrupt the various processes to establish the Wi-Fi connection between the printer 100A and the AP 6 as in the above comparative example, thus the Wi-Fi connection can be relatively quickly established between the printer 100A and the AP 6.

Further, generally, the SSID "S1" of the AP 6 may be changed by the administrator of the AP 6, however, the CO for AP including the SC for AP cannot be changed by the administrator. Accordingly, in the Wi-Fi connection in conformity with the DPP scheme, even if the SSID "S1" of the AP 6 is changed by the administrator, the Wi-Fi connection established between the printer 100A and the AP 6 is not disconnected. Consequently, by prioritizing the establishment of the Wi-Fi connection in conformity with the DPP scheme, a possibility of disconnection of the Wi-Fi connection between the printer 100A and the AP 6 can be decreased.

Further, a comparative example is assumed in which the QR Code that is used when the Wi-Fi connection in conformity with the DPP scheme is established between the printer 100A and the AP 6 is different from the QR Code that is used when the Wi-Fi connection in conformity with the ordinary Wi-Fi scheme is established between the printer 100A and the AP 6. In this comparative example, there is a possibility that a user who have little knowledge of Wi-Fi connection does not know which QR Code is to be used to establish the Wi-Fi connection between the printer 100A and the AP 6, and consequently the Wi-Fi connection is not established between the printer 100A and the AP 6. Contrary to this, in the embodiment disclosed herein, in both cases in which the Wi-Fi connection in conformity with the DPP scheme is to be established and in which the Wi-Fi connection in conformity with the ordinary Wi-Fi scheme is to be established, the Wi-Fi connection in conformity with the suitable scheme can be established between the printer 100A and the AP 6 by capturing the same QR Code displayed on the printer 100A (see T114 of FIG. 4). Consequently, user convenience is enhanced.

Further, the app 38A executes communication at the network layer or above of the OSI reference model to send the BS information sending request to the printer 100A (S40 of FIG. 3, T170 of FIG. 5) and receives the BS information including the public key PKpr from the printer 100A (S42, T174). As described above, since the app 38A executes the communication at the network layer or above, the app 38A may securely receive the public key PKpr as compared to, for example, a configuration in which the public key PKpr is received by executing the communication at layers lower than the network layer, such as Probe Req. Consequently, a wireless connection may securely be established between the printer 100A and the AP 6.

(Corresponding Relationships)

In Case A-1 and Case A-2, the printer 100A and the terminal 10A are an example of "communication device" and "terminal device", respectively. In Case B, the printer 100A and the terminal 10B are an example of "communication device" and "terminal device", respectively. In Case C, the printer 100B and the terminal 10A are an example of "communication device" and "terminal device", respectively. The AP 6 is an example of "external device". The DPP scheme and the ordinary Wi-Fi scheme are an example of "predetermined scheme" and "different scheme", respectively. The public key PKpr of the printer 100A is an example of "public key". The CO for printer including the SC for printer is an example of "first connection information". The SSID "S1" and the PW "P1" of the AP 6 are examples of "second connection information". The SSID "S2" and the PW "P2" of the wireless network in which the printer 100A operates as the G/O are examples of "third connection information". The display 114A of the printer 100A is an example of "output unit". The G/O state of the WFD scheme is an example of "parent state". The combination of the user ID "U1" and the PW "P3" is an example of "user authentication information". The printer ID, the function information and the status are examples of "device information". The information, which is included in the response, indicating whether the DPP scheme is supported is an example of "support information". In particular, the information indicating that the DPP scheme is supported is an example of "support information".

The WFD connection established in T140 of FIG. 4, the Wi-Fi connection established in T198 of FIG. 5, the Wi-Fi connection established in T280 of FIG. 6 are respectively an example of "first wireless connection", "second wireless connection", and "third wireless connection". The setup start operation accepted in T110 of FIG. 4 is an example of "establishment instruction".

The process of T110 and the process of T112 of FIG. 4 are respectively an example of "accept an establishment instruction" and "shift a state of the communication device from a non-parent state to a parent state" executed by "communication device". The process of T140 and the process of T162 are respectively an example of "establish the first wireless connection" and "send device information (and send second support information)" executed by "communication device". The processes of T170 and T172, the process of T182, the process of T184, the process of T192, and the process of T198 are respectively an example of "execute a related process", "receive an authentication request", "send an authentication response", "receive first connection information", and "establish a second wireless connection" executed by "communication device". The process of T378 and the process of T380 of FIG. 7 are respectively an example of "receive second connection information" and "establish a third wireless connection" executed by "communication device".

The process of S14 and the process of S30 of FIG. 3 are respectively an example of "send user authentication information" and "receive support information (and receive device information)" executed by "computer-readable instructions". The process of S60 is an example of "receive device information" executed by "computer-readable instructions". The processes of S34, S62 and the process of S42 are respectively an example of "cause a display unit of the terminal device to display the received device information" and "obtain the public key" executed by "computer-readable instructions". The process of S50 and the processes of S66 to S74 are respectively an example of "execute a first control process" and "execute a second control process" executed by "computer-readable instructions". In particular, the process of S74 is an example of "execute a second control process". The process of T182, the process of T184, and the process of T192 of FIG. 5 are respectively an example of "sending an authentication request", "receiving an authentication response", and "sending first connection information" executed by "terminal device". The process of T132 of FIG. 4 is an example of "execute an establishment control process" executed by "computer-readable instructions".

Second Embodiment

Next, a second embodiment will be described. The second embodiment is different from the first embodiment in that a process of S122 of FIG. 9 is executed instead of the process of S22 of FIG. 3, a specific process of S50 of FIG. 3 is different, and a specific process of S66 of FIG. 3 may be different.

(Process by Application; FIG. 9)

A process executed by an application of the second embodiment will be described with reference to FIG. 9. In the initial state of FIG. 9, a Wi-Fi connection may not be established between a terminal device and an AP (e.g., AP 6).

When YES is determined in S16 of FIG. 9, the target app determines in S122 whether a Wi-Fi connection has been established between the target terminal and the AP 6. Specifically, the memory of the target terminal stores flag information (not illustrated) which indicates whether a Wi-Fi connection has been established between the target terminal and the AP 6. When the flag information which indicates that a Wi-Fi connection has been established between the target terminal and the AP 6 is stored in the memory, the target app determines YES in S122 and proceeds to S20. On the other hand, when the flag information which indicates that the Wi-Fi connection has not been established between the target terminal and the AP 6 is stored in the memory, the target app determines NO in S122 and proceeds to S60.

When YES is determined in S122, the target app determines whether the Wi-Fi connection established between the target terminal and the AP 6 is a Wi-Fi connection in conformity with the DPP scheme or a Wi-Fi connection in conformity with the ordinary Wi-Fi scheme, and stores the result of the determination. In other words, the target app determines whether the respective sets of communication in conformity with the DPP scheme have been executed between the target terminal and the AP 6, and stores the result of the determination. The specific process is the same as the process of S22 of FIG. 3.

In S150, the target app supplies a DPP start instruction to the OS of the target terminal. The DPP start instruction includes information which indicates whether the Wi-Fi connection established between the target terminal and the AP 6 is a Wi-Fi connection in conformity with the DPP scheme or a Wi-Fi connection in conformity with the ordinary Wi-Fi scheme (see S122) as well as the BS information. This information is used when Config is executed between the target terminal and the target printer.

The specific process of S166 of FIG. 9 after NO in S122 is different from the process of S166 of FIG. 9 after NO in S20 or NO in S32. The specific process of S166 after NO in S20 or NO in S32 is the same as the process of S66 of FIG. 2.

In S166 after NO in S122, the target app sends a Probe Req by broadcasting, and obtains SSID(s) of AP(s) which is (are) present around the target terminal by receiving Probe Res(es) including the SSID(s) of the AP(s). When one or more SSIDs are obtained, the target app may cause the display unit of the target terminal to display a selection screen for the user to select one SSID among the one or more SSIDs before executing the process of S70. Then, in S70, the target app causes the display unit of the target terminal to display an input screen SC3 including one SSID among the obtained SSID(s). In a variant, when the process went thorough NO in S122, the target app may omit the process of S166. In this case, instead of the process of S70, the target app may cause the display unit of the target terminal to display an input screen including an input aera for an SSID, an input area for a PW, an OK button and a cancel button. When the target app accepts input of the SSID and the PW and accepts selection of the OK button in S72, the target app may send the inputted SSID and PW to the target printer in S74.

(Case D-1; FIG. 10)

Next, the specific case implemented by the process of FIG. 9 will be described. First, with reference to FIG. 10, Case D-1 in which a Wi-Fi connection is established between the printer 100A and the AP 6 by using the terminal 10A which has established a Wi-Fi connection in conformity with the DPP scheme with the AP 6 will be described. FIG. 10 illustrates a process continued from FIG. 4. In other words, in Case D-1, a Wi-Fi connection in conformity with the DPP scheme has been established between the terminal 10A and the AP 6 (YES in S122, YES in S20 of FIG. 9), and the printer 100A supports the DPP scheme (YES in S32).

First, in Case D-1, processes same as the processes of T170 to T178 of FIG. 5 are executed. Thereafter, the app 38A supplies the DPP start instruction to the OS 36A in T510 (S150). The DPP start instruction includes the BS information and information which indicates that the Wi-Fi connection in conformity with the DPP scheme has been established between the terminal 10A and the AP 6. Thereafter, processes same as the processes of T182 to T188 are executed.

Config of the DPP scheme is executed in T520 to T524. The processes of T520 to T524 are the same as the processes of T190 to T194 of FIG. 5. Thereafter, processes same as the processes of T195 to T199 of FIG. 5 are executed, and a Wi-Fi connection in conformity with the DPP scheme is established between the printer 100A and the AP 6. In the present case as well, both the terminal 10A and the printer 100A can participate in a wireless network formed by the AP 6.

(Case D-2; FIG. 10)

Next, with reference to FIG. 10, Case D-2 in which a Wi-Fi connection is established between the printer 100A and the AP 6 by using the terminal 10A that has established a Wi-Fi connection in conformity with the ordinary Wi-Fi scheme with the AP 6 will be described. In Case D-2, the Wi-Fi connection in which the SSID "S1" and the PW "P1" are used (i.e., a Wi-Fi connection in conformity with the ordinary Wi-Fi scheme) has been established between the terminal 10A and the AP 6 (YES in S122), the terminal 10A supports the DPP scheme (YES in S20), and the printer 100A supports the DPP scheme (YES in S32).

First, in Case D-2, processes same as the processes of T110 to T166 of FIG. 4 and the processes of T170 to T178 of FIG. 5 are executed. Thereafter, the app 38A supplies a DPP start instruction to the OS 36A in T530. The DPP start instruction includes the BS information and information which indicates that a Wi-Fi connection in conformity with the ordinary Wi-Fi scheme has been established between the terminal 10A and the AP 6. Thereafter, processes same as the processes of T182 to T188 are executed.

Config of the DPP scheme is executed in T540 to T544. The processes of T540 to T544 are the same as the processes of T190 to T194 of FIG. 5 except that the CO for printer sent in T542 from the terminal 10A to the printer 100A includes the SSID "S1" and the PW "P1" of the AP 6.

In T550, the printer 100A establishes the Wi-Fi connection in conformity with the ordinary Wi-Fi scheme with the AP 6. Specifically, the printer 100A executes the respective sets of communication such as Authentication, Association, 4-way handshake with the AP 6. When authentication using the SSID "S1" and the PW "P1" are executed in AP 6 and the authentication is successful in the process of the respective sets of communication, the Wi-Fi connection in conformity with the ordinary Wi-Fi scheme is established between the printer 100A and the AP 6. The process of T552 is the same as the process of T199. In the present case as well, both the terminal 10A and the printer 100A can participate in a wireless network formed by the AP 6. The CO for printer including the SSID "S1" and the PW "P1" of the AP 6 is an example of "first connection information".

(Case E; FIG. 11)

Next, with reference to FIG. 11, Case E in which a Wi-Fi connection is established between the printer 100A and the AP 6 by using the terminal 10A that has not established a Wi-Fi connection with an AP will be described. In the initial state of FIG. 11, a Wi-Fi connection has not been established between the terminal 10A and the AP 6 (NO in S122).

First, in Case E, processes same as the processes of T110 to T154 of FIG. 4 are executed. The processes of T660 to T666 are the same as the processes of T260 to T266 of FIG. 6.

In T670, the app 38A sends a Probe Req by broadcasting, and receives a Probe Res from the AP 6 in T672. The Probe Res includes the SSID "S1" of the AP 6. The processes of T674 to T680 are the same as the processes of T274 to T280 of FIG. 6. As described above, even in the state in which the terminal 10A has not established a Wi-Fi connection with the AP 6, a Wi-Fi connection can be established between the printer 100A and the AP 6.

(Effect of Present Embodiment)

As described above, when the terminal 10A has established a Wi-Fi connection with the AP 6 (Case D-1 and Case D-2 in FIG. 10), the printer 100A establishes a Wi-Fi connection with the AP 6 (T198 of FIG. 5 referred to in FIG. 10 (or T550)) by receiving the CO for printer (T522 of FIG. 10 (or T542 of FIG. 10)) including the SC for printer (or the SSID "S1" and the PW "P1" of the AP 6). On the other hand, when the terminal 10A has not established a Wi-Fi connection with the AP 6 (Case E in FIG. 11), the printer 100A establishes a Wi-Fi connection with the AP 6 (T680) by receiving, from the terminal 10A, the SSID "S1" and the PW "P1" of a wireless network formed by the AP 6 (T678 of FIG. 11). As described above, the printer 100A can suitably establish a Wi-Fi connection with the AP 6 in accordance with the information received from the terminal 10A.

Third Embodiment

Next, a third embodiment will be described. In the third embodiment, timings at which the processes of S30 and S32 of FIG. 3 are executed are different. Further, in the third embodiment, the process of S60 is not executed. Hereafter, points different from the first embodiment will mainly be described. Further, in FIG. 12, the same step number is given to a step of the process same as the first embodiment, and the detailed explanation thereof will be omitted.
(Process by Application; FIG. 12)

With reference to FIG. 12, a process executed by an application of the third embodiment will be described. When YES is determined in S16 of FIG. 12, the target app executes the processes of S30 and S32. The target app proceeds to S20 when YES is determined in S32, while proceeds to S62 when NO is determined in S32. When NO is determined in S20, the target app proceeds to S62. Likewise, the target app proceeds to S62 when NO is determined in S22.

In other words, in the third embodiment, whether a printer supports the DPP scheme is determined before determination of whether a terminal supports the DPP scheme. In such a case as well, the terminal can establish a Wi-Fi connection in conformity with a suitable scheme between the printer and an AP.
(Variant 1)

The printer 100A may shift to a Soft AP parent station instead of shifting to the G/O in conformity with the WFD scheme in T112 of FIG. 4. In the present variant, the process of shifting to the Soft AP parent station is an example of a process of "shift a state of the communication device from a non-parent state to a parent state" executed by "communication device". In another variant, in response to the printer 100A accepting the setup start operation, a QR Code including information which indicates that a terminal (e.g., the terminal 10A) is to be the parent station may be displayed. Then, in response to the QR Code being captured by the terminal 10A, the terminal 10A may shift to the G/O state of the WFD scheme and a WFD connection may be established between the terminal 10A and the printer 100A. In the present variant, "shift a state of the communication device from a non-parent state to a parent state" executed by "communication device" can be omitted. In general terms, in "first wireless connection", "communication device" may operate as the parent station, or "terminal device" may operate as the parent station.
(Variant 2)

In T114, the printer 100A may display a QR Code in which a message prompting a user to bring the terminal closer to the printer 100A is encoded to establish a Near Field Communication (NFC) connection between the printer 100A and the terminal (e.g., the terminal 10A). In this case, the app 38A may display the message on the terminal 10A. Consequently, in response to the terminal 10A being brought closer to the printer 100A, an NFC connection may be established between the terminal 10 and the printer 100A in T140 of FIG. 4. In the present variant, display of the above message is an example of the process of "execute an establishment control process" executed by "computer-readable instructions", and an NFC connection is an example of "first wireless connection". In the present variant, "obtain third connection information" executed by "computer-readable instructions" may be omitted. In another variant, in T140 of FIG. 4, a Bluetooth (registered trademark) (BT) connection may be established between the terminal 10A and the printer 100A. In the present variant, the BT connection is an example of "first wireless connection". In general terms, "first wireless connection" may not be a wireless connection in conformity with the Wi-Fi standards.
(Variant 3)

The printer 100A may cause the print executing unit 118A to print a QR Code in which the SSID "S2" and the PW "P2" are coded in T114 of FIG. 4. In the present variant, the process of capturing the printed QR Code to obtain the SSID "S2" and the PW "P2" is an example of "obtain third connection information" executed by "computer-readable instructions". In another variant, the printer 100A may supply the SSID "S2" and the PW "P2" to the NFC I/F in T114. In this case, the terminal (i.e., the terminal 10A) obtains the SSID "S2" and the PW "P2" in response to the terminal being brought closer to the printer 100A. In the present variant, the process of obtaining the SSID "S2" and the PW "P2" via the NFC I/F is an example of the process of "obtain third connection information" executed by "computer-readable instructions". In another variant, the printer 100A may supply the SSID "S2" and the PW "P2" to the BT I/F in T114. In this case, the terminal (e.g., the terminal 10A) obtains the SSID "S2" and the PW "P2" via the BT I/F. In the present variant, the process of obtaining the SSID "S2" and the PW "P2" via the BT I/F is an example of "obtain third connection information" executed by "computer-readable instructions".
(Variant 4)

The printer 100A may send, to the terminal 10A, a response which does not include the printer ID "AAA", the function information, or the status in T162 of FIG. 4. In the present variant, "send device information" executed by "communication device" may be omitted. Further, when NO is determined in S20 or when NO is determined in S22, the app 38 may omit the processes of S60 to S64 of FIG. 3 and proceed to the process of S66. In the present variant, "send device information" executed by "communication device" may be omitted, and "receive device information" and "cause a display unit of the terminal device to display the received device information" executed by "computer-readable instructions" may be omitted.
(Variant 5)

The app 38A may omit the processes of S10 to S16 of FIG. 3. In the present variant, "send user authentication information" executed by "computer-readable instructions" may be omitted.
(Variant 6)

The PW "P1" may not be set in the AP 6. In this case, for example, the terminal 10A may establish a Wi-Fi connection in conformity with the ordinary Wi-Fi scheme with the AP 6 in response to selection of the SSID "S1" of the AP 6. In general terms, "second connection information" may not include "password inputted by a user".
(Variant 7)

The terminal 10A and the printer 100A may support a different scheme different from the DPP scheme, and the printer 100A may execute respective sets of communication of the authentication request, the authentication response, and the first connection information between the terminal 10A and the printer 100A in conformity with the different scheme different from the DPP scheme. In general terms, "predetermined scheme" is not limited to the DPP scheme.

(Variant 8)

Instead of the process of T170 of FIG. 5, the app 38A may generate the public key PKpr which is to be used by the printer 100A. In this case, the app 38A may send the generated public key PKpr to the printer 100A. In the present variant, the process of receiving the public key PKpr by the printer 100A from the terminal 10A is an example of "execute a related process" executed by "communication device". Further, the process of generating the public key PKpr by the app 38A is an example of "obtain the public key" executed by "computer-readable instructions".

(Variant 9)

The printer 100A may accept the access to the printer 100A which functions as a web server from a terminal (e.g., the terminal 10A) in T110 of FIG. 4, and accept the setup start operation from the terminal via the webserver. In the present variant, acceptance of the setup start operation from the terminal via the webserver is an example of "accept an establishment instruction" executed by "communication device".

(Variant 10)

In the above embodiments, the processes of T182 to T194 of FIG. 5 are executed by the OS 36A of the terminal 10A. Instead of this, these processes may be executed by the app 38A.

(Variant 11)

In the above embodiments, the processes of FIG. 2 to FIG. 12 are implemented by a software (e.g., the OSs 36A, 36B, the apps 38A, 38B, the programs 136A, 136B), however, at least one of the processes may be implemented by hardware such as a logic circuit.

What is claimed is:

1. A non-transitory computer-readable recording medium storing computer-readable instructions for a terminal device,
wherein the computer-readable instructions, when executed by a processor of the terminal device, cause the terminal device to:
receive support information from a communication device by using a first wireless connection which has been established between the terminal device and the communication device, the support information indicating whether the communication device supports a predetermined scheme of a Wi-Fi standard;
in a case where the support information indicates that the communication device supports the predetermined scheme and a wireless connection between the terminal device and an external device different from the terminal device has been established, execute a first control process for executing wireless communication in conformity with the predetermined scheme between the terminal device and the communication device,
wherein the wireless communication in conformity with the predetermined scheme further comprises:
sending an authentication request in which a public key of the communication device is used to the communication device;
in a case where the authentication request is sent to the communication device, receiving an authentication response from the communication device; and
after the authentication response has been received from the communication device, sending first connection information to the communication device, the first connection information being information used by the communication device for establishing a second wireless connection in conformity with the predetermined scheme between the communication device and the external device; and
in a case where the support information indicates that the communication device does not support the predetermined scheme or the wireless connection between the terminal device and the external device has not been established, execute a second control process for executing wireless communication in conformity with a different scheme of the Wi-Fi standard different from the predetermined scheme between the terminal device and the communication device,
wherein the wireless communication in conformity with the different scheme comprises:
sending second connection information to the communication device by using the first wireless connection without sending the authentication request to the communication device, the second connection information being information used by the communication device for establishing a third wireless connection in conformity with the different scheme between the communication device and the external device.

2. The non-transitory computer-readable recording medium as in claim 1, wherein
the first control process is executed in a case where the terminal device has executed wireless communication in conformity with the predetermined scheme with the external device and the support information indicates that the communication device supports the predetermined scheme, and
the second control process is executed in a case where the terminal device has not executed the wireless communication in conformity with the predetermined scheme with the external device.

3. The non-transitory computer-readable recording medium as in claim 1, wherein
the computer-readable instructions, when executed by the processor, further cause the terminal device to:
receive device information related to the communication device from the communication device by using the first wireless connection; and
cause a display unit of the terminal device to display the received device information.

4. The non-transitory computer-readable recording medium as in claim 1, wherein
the computer-readable instructions, when executed by the processor, further cause the terminal device to:
send user authentication information to the communication device by using the first wireless connection,
wherein the second wireless connection between the communication device and the external device is established in a case where an authentication of the user authentication information is successful in the communication device and the communication device receives the first connection information from the terminal device,
the third wireless connection between the communication device and the external device is established in a case where the authentication of the user authentication information is successful in the communication device and the communication device receives the second connection information from the terminal device, and
neither the second wireless connection nor the third wireless connection is established in a case where the authentication of the user authentication information fails in the communication device.

5. The non-transitory computer-readable recording medium as in claim 1, wherein
the computer-readable instructions, when executed by the processor, further cause the terminal device to:
execute an establishment control process for establishing the first wireless connection with the communication device.

6. The non-transitory computer-readable recording medium as in claim 5, wherein
the first wireless connection is a wireless connection for the communication device to operate as a parent station and for the terminal device to operate as a child station, and
the computer-readable instructions, when executed by the processor, further cause the terminal device to:
obtain third connection information for establishing the first wireless connection,
wherein the establishment control process is executed by using the third connection information.

7. The non-transitory computer-readable recording medium as in claim 1, wherein
the first wireless connection is a wireless connection in conformity with the Wi-Fi standard.

8. The non-transitory computer-readable recording medium as in claim 1, wherein
the first connection information does not include information inputted by a user, and
the second connection information includes a password inputted by the user.

9. The non-transitory computer-readable recording medium as in claim 1, wherein
the predetermined scheme is a Device Provisioning Protocol (DPP) scheme,
the first connection information is a Configuration Object of the DPP scheme, and
the second connection information includes a Service Set Identifier (SSID) of a wireless network formed by the external device.

10. The non-transitory computer-readable recording medium as in claim 1, wherein
the computer-readable instructions, when executed by the processor, further cause the terminal device to:
in the case where the support information indicates that the communication device supports the predetermined scheme, obtain the public key of the communication device,
wherein the sending of the authentication request includes sending the authentication request in which the obtained public key is used to the communication device.

11. A terminal device comprising:
a controller,
wherein the controller is configured to:
receive support information from a communication device by using a first wireless connection which has been established between the terminal device and the communication device, the support information indicating whether the communication device supports a predetermined scheme of a Wi-Fi standard;
in a case where the support information indicates that the communication device supports the predetermined scheme and a wireless connection between the terminal device and an external device different from the terminal device has been established, send an authentication request in which a public key of the communication device is used to the communication device, the authentication request being a request in conformity with the predetermined scheme of the Wi-Fi standard;
in a case where the authentication request is sent to the communication device, receive an authentication response in conformity with the predetermined scheme from the communication device;
after the authentication response has been received from the communication device, send first connection information to the communication device, the first connection information being information used by the communication device for establishing a second wireless connection in conformity with the predetermined scheme between the communication device and the external device, and
in a case where the support information indicates that the communication device does not support the predetermined scheme or the wireless connection between the terminal device and the external device has not been established, send second connection information to the communication device by using the first wireless connection without sending the authentication request to the communication device, the second connection information being information used by the communication device for establishing a third wireless connection in conformity with a different scheme of the Wi-Fi standard different from the predetermined scheme between the communication device and the external device.

12. A communication device comprising:
a controller, wherein
the controller is configured to:
in a case where a wireless connection between the terminal device and an external device has been established, receive an authentication request in which a public key of the communication device is used from a terminal device different from the external device, the authentication request being in conformity with a predetermined scheme of a Wi-Fi standard;
in a case where the authentication request is received from the terminal device, send an authentication response in conformity with the predetermined scheme to the terminal device;
after the authentication response has been sent to the terminal device, receive first connection information in conformity with the predetermined scheme from the terminal device;
in a case where the first connection information is received from the terminal device, establish a second wireless connection with the external device by using the first connection information;
in a case where the wireless connection between the terminal device and the external device has not been established, receive second connection information from the terminal device by using a first wireless connection which has been established between the terminal device and the communication device without receiving the authentication request from the terminal device, the second connection information being information in conformity with a different scheme of the Wi-Fi standard different from the predetermined scheme; and
in a case where the second connection information is received from the terminal device, establish a third wireless connection in conformity with the different scheme with the external device by using the second connection information.

13. The communication device as in claim 12, wherein the controller is further configured to:
send support information to the terminal device by using the first wireless connection, the support information indicating that the communication device supports the predetermined scheme,
wherein the controller is configured to establish the second wireless connection with the external device by using the first connection information in a case where the first connection information is received from the terminal device based on having sent the support information, and
the controller is configured to establish the third wireless connection with the external device by using the second connection information in a case where the second connection information is received from the terminal device in spite of having sent the support information.

14. The communication device as in claim 12, wherein
in a case where the terminal device supports the predetermined scheme, the controller is configured to receive the authentication request from the terminal device, and
in a case where the terminal device does not support the predetermined scheme, the controller is configured to receive the second connection information from the terminal device by using the first wireless connection without receiving the authentication request from the terminal device.

15. The communication device as in claim 12, wherein
in a case where the terminal device has executed wireless communication in conformity with the predetermined scheme with the external device, the controller is configured to receive the authentication request from the terminal device, and
in a case where the terminal device has not executed the wireless communication in conformity with the predetermined scheme with the external device, the controller is configured to receive the second connection information from the terminal device by using the first wireless connection without receiving the authentication request from the terminal device.

16. The communication device as in claim 12, wherein the controller is further configured to:
send device information related to the communication device to the terminal device by using the first wireless connection, wherein in response to the device information being received by the terminal device, the device information is displayed on a display unit of the terminal device.

17. The communication device as in claim 12, wherein the controller is further configured to:
accept an establishment instruction for establishing a wireless connection with the external device from a user;
in a case where the establishment instruction is accepted, shift a state of the communication device from a non-parent state to a parent state, the non-parent state being a state not operating as a parent station and the parent state being a state operating as the parent station; and
after the state of the communication device has been shifted to the parent state, establish the first wireless connection in which the communication device operates as the parent station and the terminal device operates as a child station.

18. The communication device as in claim 12, wherein the controller is further configured to:
execute a related process related to the public key in a case where the terminal device supports the predetermined scheme, wherein the public key is obtained by the terminal device, and
the controller is configured to receive the authentication request in which the obtained public key is used from the terminal device.

* * * * *